United States Patent
Majid et al.

(10) Patent No.: US 9,025,192 B1
(45) Date of Patent: May 5, 2015

(54) SYSTEMS AND METHODS FOR DYNAMIC MOBILE PRINTING BASED ON SCHEDULED EVENTS

(71) Applicant: AOL Inc., Dulles, VA (US)

(72) Inventors: Mohammed Abdul Majid, Sterling, VA (US); Maureen Jules-Perez, Leesburg, VA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 14/341,208

(22) Filed: Jul. 25, 2014

(51) Int. Cl.
*G06F 3/12* (2006.01)

(52) U.S. Cl.
CPC ............ *G06F 3/1263* (2013.01); *G06F 3/1211* (2013.01); *G06F 3/1285* (2013.01)

(58) Field of Classification Search
USPC ........................................................ 358/1.15
See application file for complete search history.

(56) References Cited

U.S. PATENT DOCUMENTS

| | | | |
|---|---|---|---|
| 5,974,234 A | 10/1999 | Levine et al. | |
| 7,084,997 B2 * | 8/2006 | Clough | 358/1.15 |
| 7,299,490 B2 | 11/2007 | Berkema et al. | |
| 8,630,010 B2 | 1/2014 | Iida | |
| 2011/0231864 A1 | 9/2011 | Raj B.K et al. | |
| 2012/0229838 A1 * | 9/2012 | Mogaki | 358/1.14 |
| 2013/0163027 A1 | 6/2013 | Shustef | |
| 2014/0343980 A1 * | 11/2014 | Majid et al. | 705/7.12 |

* cited by examiner

*Primary Examiner* — Ngon Nguyen
(74) *Attorney, Agent, or Firm* — Bookoff McAndrews, PLLC

(57) ABSTRACT

Systems and methods are disclosed method for dynamic mobile printing based on scheduled events. One method includes receiving, from a device associated with a user, an identifier associated with the user and a print request, the print request including one or more print items to be printed; accessing, by a server, a calendar of the user based on the received identifier associated with the user; determining, by the server, whether an event of the calendar is scheduled for a time of interest; locating, by the server, a printer near a location of the event when the event is scheduled for the time of interest; and transmitting, by the server, the one or more print items to the printer near the location of the event.

20 Claims, 19 Drawing Sheets

SYSTEMS AND METHODS FOR DYNAMIC MOBILE PRINTING BASED ON SCHEDULED EVENTS

TECHNICAL FIELD

Various embodiments of the present disclosure relate generally to increasing productivity and accessibility of resources in a physical facility. More specifically, exemplary embodiments of the present disclosure relate to systems and methods for reducing an individual's time spent on accessing information or making a request relating to a facility, and improving the accuracy and efficiency in fulfilling a request via mobile communication.

BACKGROUND

In any facility, such as an office building, apartment building, commercial building (e.g., mall), sporting/music venue, or the like, people often find themselves desiring information about the facility and/or desiring to submit a request relating to their interaction with the facility. For example, people may desire information about where various rooms, stores, or amenities are located. In addition, or alternatively, people might desire to submit various requests, such as requests to have certain facilities repaired, or to reserve portions of a facility for private use. As a result, building managers traditionally erected physical directories, or distributed paper directories that individuals could consult to explore the facility. Also, management would traditionally implement procedures for making requests, such as by filling out a request form with a facilities department, or submitting a conference room request form, etc.

In the context of commercial buildings, in particular, many employers implement programs to train employees on how to submit request forms to address various issues. In addition to the time and expense spent on these training programs, the actual request may take time being submitted to the appropriate department and may lack sufficient specificity for the request to be implemented. In the meantime, or instead of sending the request, the employee may spend time attempting to resolve the request on his or her own. This may result is a loss of employee productivity and/or an inaccurate or incomplete resolution to the initial request. For example, an employee may wish to report a problem with his or her printer to the information technology (IT) department of his or her employer. In order to do this, the employee may have to make a call, compose an email, and/or fill out a form making a request; wait to communicate with an IT officer; and check back with the IT officer to obtain the status of the request. These steps may take a significant amount of time, reducing employees' happiness and productivity, and may result in the request not being timely completed.

Accordingly, a need exists for systems and methods for facilitating accurate, efficient and rapid processing of facilities requests. The present disclosure is directed to, among other things, improving an experience and reducing an amount of time spent on making a facilities request, and to improving the accuracy of fulfilling a request via mobile communication.

SUMMARY OF THE DISCLOSURE

According to certain embodiments, a computer-implemented method is disclosed for dynamic mobile printing based on scheduled events, the method comprising: receiving, from a device associated with a user, an identifier associated with the user and a print request, the print request including one or more print items to be printed; accessing, by a server, a calendar of the user based on the received identifier associated with the user; determining, by the server, whether an event of the calendar is scheduled for a time of interest; locating, by the server, a printer near a location of the event when the event is scheduled for the time of interest; and transmitting, by the server, the one or more print items to the printer near the location of the event.

According to certain embodiments, a system is disclosed for dynamic mobile printing based on scheduled events, the system comprising: a memory storage device storing instructions for dynamic mobile printing based on scheduled events; and one or more processors configured to execute the instructions to perform a method including: receiving, from a device associated with a user, an identifier associated with the user and a print request, the print request including one or more print items to be printed; accessing, by a server, a calendar of the user based on the received identifier associated with the user; determining, by the server, whether an event of the calendar is scheduled for a time of interest; locating, by the server, a printer near a location of the event when the event is scheduled for the time of interest; and transmitting, by the server, the one or more print items to the printer near the location of the event.

According to one embodiment, a computer-readable medium is disclosed that stores instructions that, when executed by a processor, cause the processor to execute a method dynamic mobile printing based on scheduled events, the method comprising: receiving, from a device associated with a user, an identifier associated with the user and a print request, the print request including one or more print items to be printed; accessing, by a server, a calendar of the user based on the received identifier associated with the user; determining, by the server, whether an event of the calendar is scheduled for a time of interest; locating, by the server, a printer near a location of the event when the event is scheduled for the time of interest; and transmitting, by the server, the one or more print items to the printer near the location of the event.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
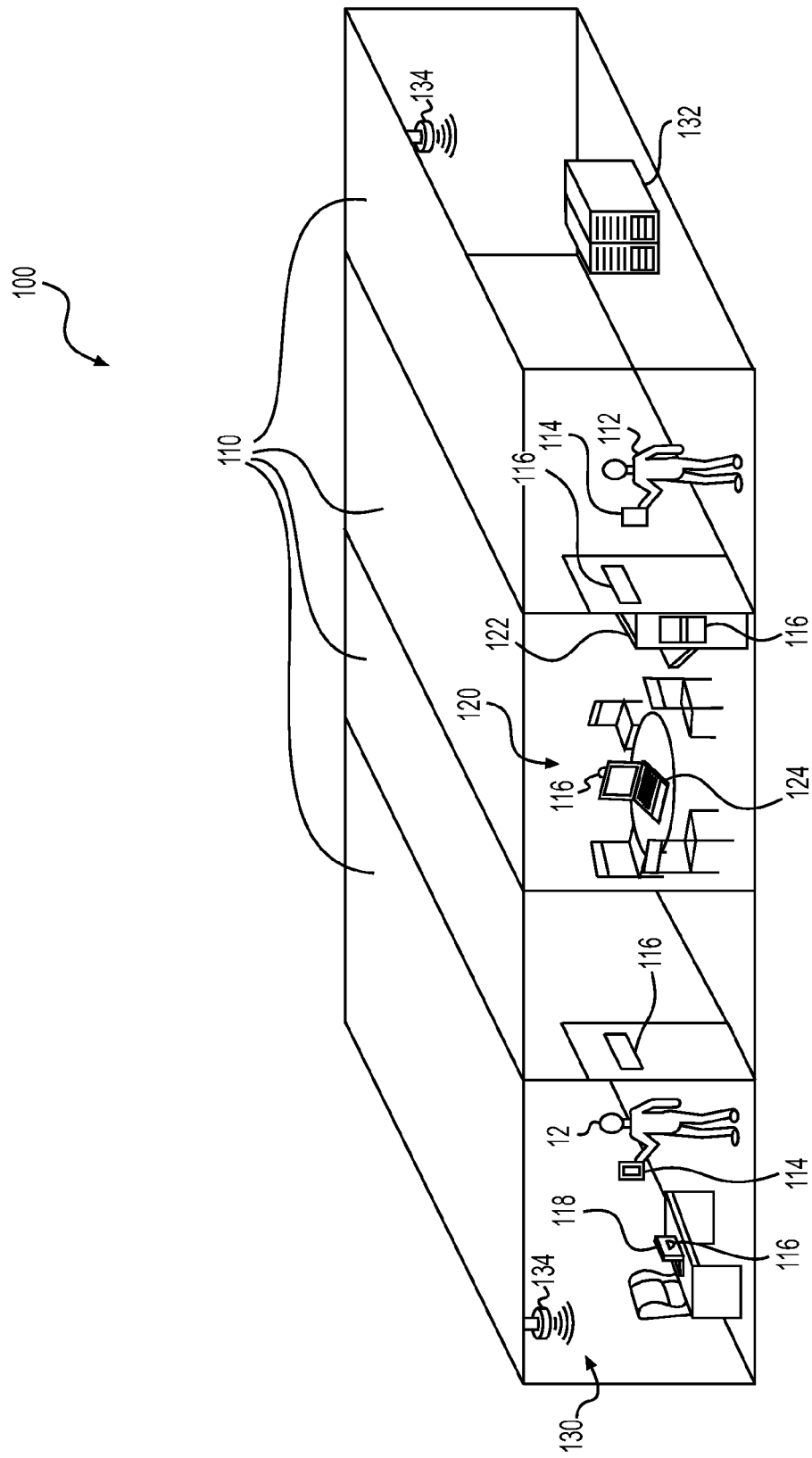
FIG. 1 is a schematic diagram of an environment in which a user may identify and submit information related to a request for information or services relating to a facility, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for improving an individual's or user's interaction with a facility and/or the people and services associated with the facility; to reducing an amount of time spent on making a request; and to improving the accuracy of fulfilling a facilities-related request via mobile communication.

According to embodiments of the present disclosure, a user may use a mobile device in communication with a wireless ("Wi-Fi") router or a wireless network that is in communication with the Internet to submit a request for information or services. Although described herein as often pertaining to mobile devices and applications, it should be appreciated that the user may be operating any type of electronic device, whether mobile or not. In one embodiment, the user may submit the request to a server by submitting an image of the user's identifier (e.g., ID, workplace badge, or building badge), and/or an asset's, component's, or entity's identifier to a server via the Internet or other network. Based on the submitted identifier(s), the server may access a database to retrieve information regarding the user or entity associated with the identifier, and identify the user's location based on the leveraged Wi-Fi router or any other location-specific indicators. Alternatively, the location of the user may be identified using global positioning ("GPS") coordinates of the user. The server may then prompt the user to submit a specific request based on the identified asset, component, or entity and/or location of the user. Once received, the server may process the request and provide the user with information regarding the status of the request and may also update any databases and/or provide other users information regarding the request.

According to another embodiment of the present disclosure, a user may use a mobile device in communication with the Wi-Fi router or the wireless network that is in communication with the Internet to schedule printing and/or to print based on the schedule of the user and/or a location of the user. In an embodiment, the user may create, access, update, and/or store events on his or her calendar that is stored on a calendar server system. When creating an event, the user may provide the time and date of the event and may provide a location of the event. The user may enter the location of the event and/or have a server identify the user's location for the location of the event. The user may also provide one or more documents to be printed for the event. If the user provides documents for the event, a server may store the documents, and print the documents to a printer near the event's location at or near the time of the event. Alternatively, or additionally, the user may request that the server print the documents at a user-provided location and a user-provided time.

Referring now to the figures, FIG. 1 is a schematic diagram of an environment in which a user may identify and submit information related to a request for information, printing, or services relating to a facility, according to exemplary embodiments of the present disclosure. Specifically, FIG. 1 depicts and environment or facility 100, which may be an office building, apartment building, commercial building (e.g., mall), sporting/music venue, or the like. In one embodiment, environment or facility 100 may be a workplace for a plurality of individuals or users 112 ("people," "individuals," and "users" are used interchangeably herein). In one embodiment, facility 100 may include one or more physical spaces or rooms 110. Of course, it should be appreciated that facility 100 may span any number of campuses, buildings, or cities. Facility 100 may be a complex network of buildings for a multi-national corporation spread around the globe. Alternatively, facility 100 may be as small as a single office.

As described above, facility 100 may be configured to enable users to identify and submit information related to a request for information, printing, or services relating to the facility. Accordingly, facility 100 may be provided with one or more systems, devices, and indicia with which users may interact to submit requests for information or services from those systems and devices. For example, facility 100 may be provided with a server system 132 provided in communication with one or more wireless access points ("WAPs") 134. Server systems 132 may include databases and processors configured to execute methods of enabling users to request information or services relating to the facility. In addition, server systems 132 may include any number of servers relating to the facility and/or a business occupying the facility, such as e-mail servers, printing servers, calendar servers, helpdesk servers, information technology and/or Internet technology (collectively, "IT") servers, human resources ("HR") servers, employee servers, document management servers, etc., as will be described in more detail below.

In addition, one or more of users 112 (which may be owners and/or employees of the business(es) occupying the facility 100) may each possess one or more electronic devices 114, for interacting with the facility 100, and more specifically, for interacting with the server systems 132 and/or WAPs 134. In one embodiment, the users' electronic devices 114 may be any type of mobile phone, personal data assistant ("PDA"), tablet, personal computer ("PC"), an electronic kiosk, or any other electronic device that may send and receive information via a wireless network, such as over the Internet or a local- or wide-area network ("LAN" or "WAN"). One or more of the electronic devices 114 may include an optical component configured to capture and/or recognize an image, and save and/or transmit the image via the Internet or a wireless network. For example, the optical component may be a camera, scanner, or any other suitable optical component. The electronic devices 114 may also be provided with a Bluetooth or other radio frequency communication protocol, and/or a near field communication ("NFC") device, for communicating with other suitably-provisioned devices. Alternatively, or in addition to an optical component, the electronic devices 114 may include one or more audio and/or video components configured to capture and/or recognize a sound, series of sounds, and/or frame(s), and save and/or transmit the sound(s) and/or frame(s) via the wireless network. For example, an audio component may include a microphone, or any other suitable audio component, and a video component may include any type of camera.

In one embodiment, an optical component of each of electronic devices 114 may be used to capture and/or recognize an identifier or indicia 116 associated with any entity or asset of the facility 100, such as a user, a piece of equipment (e.g. printer 122, laptop 118, 124, tablet, television, desk, chair, etc.), a physical location (e.g. office building, conference room 120, office 130, etc.), or any other entity. The indicia 116 may be any machine-readable visual representation capable of being captured and/or scanned by an optical component of an electronic device 114. For example, the indicia 116 may be a one, two, or three dimensional barcode, or any other visual identifier. Alternatively, the indicia 116 may include alphanumeric indicia, such as a name, room number, serial number, etc., which the electronic device 114 or related device or module may decode or otherwise recognize as indicative of the entity or asset of the facility 100. In one embodiment, the indicia 116 may be associated with an entity or asset, and the association may be saved in retrievable memory, such as on a computer readable medium associated with server systems 132.

Figure 2:
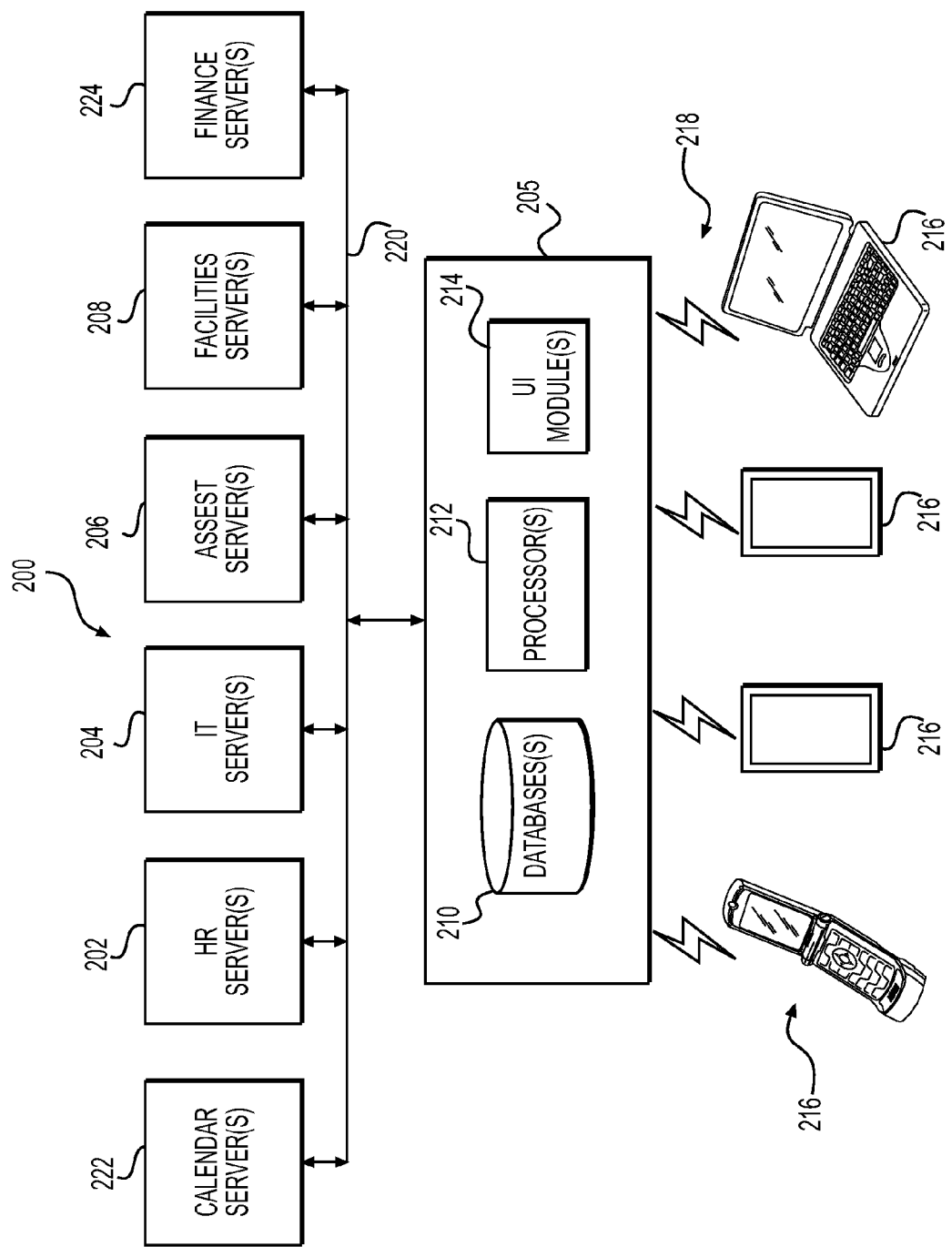
FIG. 2 is a diagram of a system configured to enable users to identify and submit information related to a request for information or services relating to a facility, according to an exemplary embodiment of the present disclosure.

FIG. 2 is a diagram of a system 200 configured to enable users to identify and submit information related to a request for information, printing, or services relating to a facility, according to an exemplary embodiment of the present disclosure. In one embodiment, system 200 may include one or more of HR server systems 202, IT server systems 204, asset management server systems 206, facilities server systems 208, calendar server systems 222, and finance server system 224. System 200 may further include mobile facilities request server systems 205 (hereafter, "request server 205"), which may include one or more databases 210, one or more processors 212, and/or one or more user interface ("UI") modules 214. System 200 may further include or be provided in communication with a plurality of mobile devices 216. As described above, mobile devices 216 may correspond to one or more electronic devices 114, which may be any type of mobile phone, PDA, tablet, PC, an electronic kiosk, or any other electronic device that may send and receive information via a wireless network 218, such as over the Internet or LAN or WAN. In addition, request server 205 may correspond to server systems 132 provided in communication with one or more WAPs 134 within a facility 100, and users may interact with request server 205 via any electronic devices 114 and/or mobile devices 216.

In one embodiment, a record of an association of an identifier of an asset or entity saved in memory may be located in one or more locations based on one or more characteristics of the entity. These locations may be servers or other suitable devices configured to house and access computer readable memory. For example, in an organization, such as a large corporation, educational organization, government agency, etc., a separate server may store information for a particular department. In the exemplary example shown in FIG. 2, an organization may have a network 220 with separate servers, such as the HR server systems 202, configured to store, share, and update, information regarding employees; the IT server systems 204, configured to store, share, and update information regarding electronic equipment and requests to repair electronic equipment; the asset management server systems 206, configured to store, share, and update information regarding physical property; the facilities server systems 208, configured to store, share, and update information regarding various buildings and offices that are part of the organization, the calendar server systems 222, configured to store, share, and update information regarding employees' calendars, and/or finance server systems 224, configured to store, share, and update information regarding costs and charges.

The servers may communicate with one or more servers, such as request server 205, having database(s) 210, processor(s) 212, and UI module(s) 214, via any LAN and/or WAN. The communication may be through wires or wirelessly via the Internet or LAN or WAN, or any other suitable means. The servers, such as request server 205, may receive and transmit information from devices, such as mobile devices 216 and other devices that may connect to request server 205. Each server systems, such as HR server systems 202, IT server systems 204, asset management server systems 206, facilities server systems 208, calendar server systems 222, and/or finance server systems 224, may communicate directly with each other via the network 220 or through a server or servers, such as request server 205, or any other server and/or server system.

In one embodiment, database(s) 210 may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. In addition, processor(s) 212 may include one or more processors for processing data according to instructions stored in the memory. The functions of the processor may be provided by a single dedicated processor or by a plurality of processors. Moreover, the processor may include, without limitation, digital signal processor ("DSP") hardware, or any other hardware capable of executing software. The UI module(s) 214 may include any type or combination of programs for generating UIs displayed on mobile devices 216, including but not limited to any input/output devices, such as a display monitor, touchpad, touchscreen, microphone, camera, keyboard, and/or mouse. In one embodiment, UI module(s) 214 may be configured to implement any number or type of UIs, whether tailored for desktop PC or mobile device implementation, including but not limited to the user interfaces described below with respect to FIGS. 5-9B.

In one embodiment, HR server systems 202 may be configured to implement any number or type of systems configured to manage people or employees, such as individual location information, demographic information, individual desk or office information, individual photographs, individual home addresses, individual equipment assignments, etc. IT server systems 204 may be configured to implement any number or type of systems configured to manage and store individual IT assignments, such as computer, printer, or mobile device assignments, including device IDs (e.g., MAC ID or serial numbers), an IT profile, a search and/or browsing history, a clearance/accessibility level, etc. Asset management server systems 206 may be configured to implement any number or type of systems configured to manage and store information relating to any asset, equipment, or component of a facility, such as printer, computer, wireless access point, lab equipment, server, display, projector, television, or any other device or system considered to be an asset of the facility. Facilities server systems 208 may be configured to implement any number or type of systems configured to manage and store information relating to a component of a facility, such as a facility floor plan, campus map, global map, facility map, equipment map, amenities map, facility amenities map, and so on. Calendar server systems 222 may be configured to implement any number or type of systems configured to manage and store information relating to a calendar of an individual, such as events, locations, times, dates, attendees, documents, attachments, event information, etc. Finance server systems 224 may be configured to implement any number or type of systems configured to manage and store information relating to finances, such as costs for assets and resources usage. Any one or more of HR server systems 202, IT server systems 204, asset management server systems 206, facilities server systems 208, calendar server systems 222, and/or finance server systems 224 may be configured to store information relating to requests, generate presentations of information, generate tickets for initiating the performance of service or maintenance, store documents for printing, calendar events, book locations, and so on.

In one embodiment, request server 205 may be configured to communicate with one or more of HR server systems 202, IT server systems 204, asset management server systems 206, facilities server systems 208, calendar server systems 222, and/or finance server systems 224 to perform the methods described herein, whether by wired or wireless communications. For example, request server 205 may include one or more translators or application programming interfaces ("APIs") configured to communicate with various types of known servers systems for managing assets, equipment, people, facilities, calendars, finances and so on. In addition, request server 205 may be configured to facilitate interaction between mobile devices 216 and those server systems 202-208, whether directly or indirectly, and whether through the Internet or over LAN or WAN.

Figure 3:
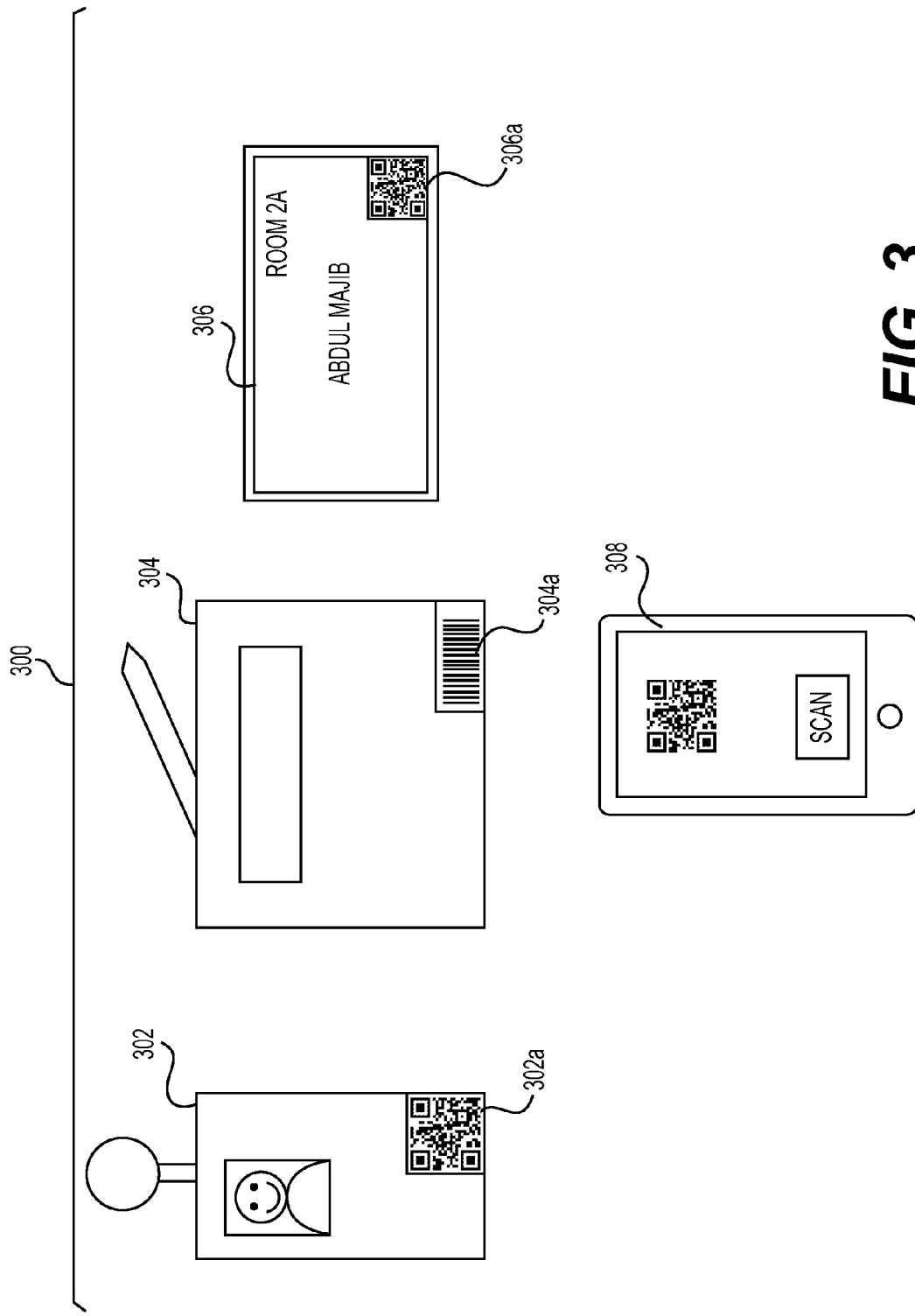
FIG. 3 is a schematic diagram of devices and indicia configured to enable users to identify and submit information related to a request for information or services relating to a facility, according to an exemplary embodiment of the present disclosure.

As described above, in one embodiment, mobile devices 216 may be configured to interact with a facility 100 through, among other means, imaging of indicia 116 (FIG. 1). Accordingly, in one embodiment, system 200 of FIG. 2 may be configured to operate in conjunction with exemplary indicia depicted in FIG. 3. FIG. 3 is a schematic diagram of devices and indicia 300 configured to enable users to identify and submit information related to a request for information or services relating to a facility, according to an exemplary embodiment of the present disclosure.

For example, as shown in FIG. 3, in one embodiment, a two-dimensional barcode 302a may be displayed on an ID badge 302 of a user, such as an employee of a company, or a student at an educational institution, or any other organization. Also shown in FIG. 3 are other examples of identifiers or indicia, such as a one-dimensional bar code 304a displayed on a surface of a piece of equipment, such as a printer 304, and a two-dimensional bar code 306a displayed on a name plate of a room 306, such as an office and/or a conference room. As shown in FIG. 3, a mobile device 308 containing an optical component, e.g., a camera, may be used to capture an image of the identifier or indicia 302a, 304a, 306a, associated with the respective entity and transmit the image to a server for processing a request. Alternatively, mobile device 308 may read and decode any indicia, or otherwise locally obtain one or more data elements or unique IDs from the indicia. In one embodiment, a user may scan his or her own badge 302, containing indicia 302a (e.g., a two-dimensional barcode or QR code) to log-in to a mobile application on a mobile device, such as electronic device 114, mobile device 216, and/or mobile device 308. For example, the indicia 302a may contain a unique ID associated with the user's identity, whether in an HR database such as in an HR server systems 202, or otherwise. The user may then, once logged-in, easily interact, directly or indirectly, with assets and/or components of a facility 100 (e.g., printer 304 and/or room 306 of facilities) to make certain requests for information or services relating to those assets or facilities.

Figure 4:
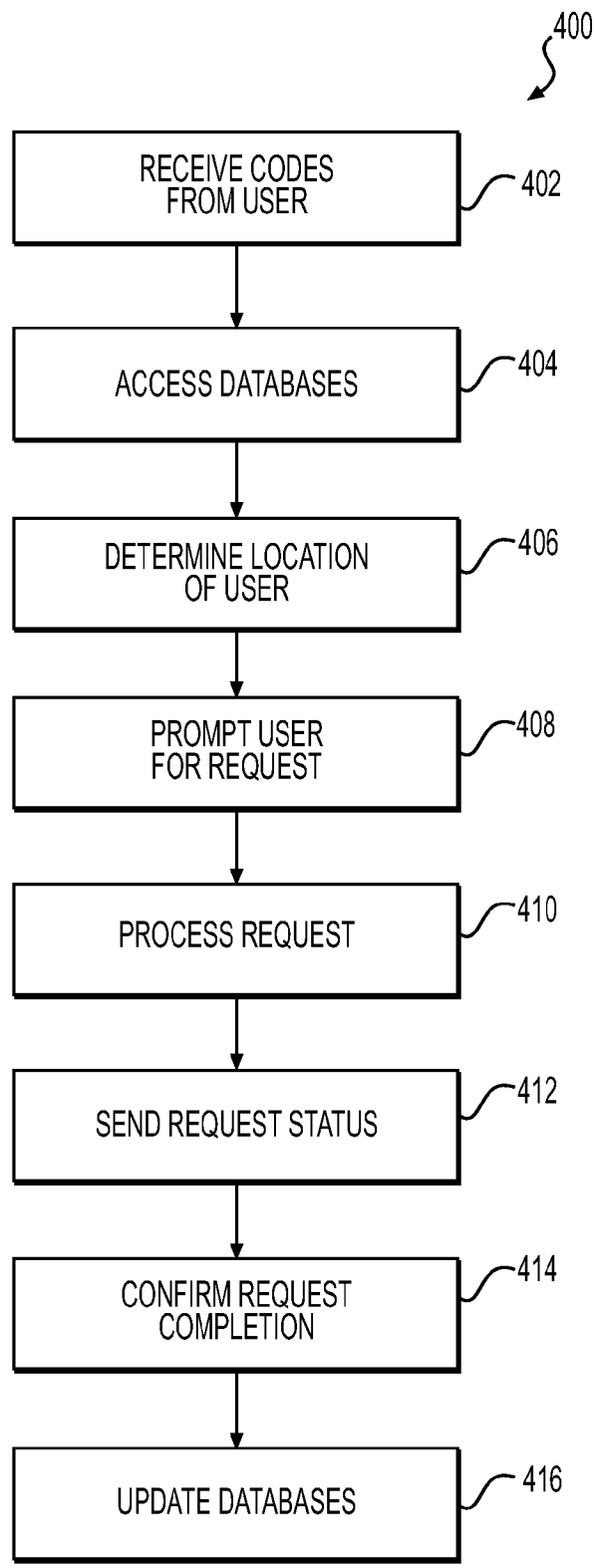
FIG. 4 is a flow diagram of an exemplary method for enabling users to identify and submit information related to a request for information or services relating to a facility, according to an exemplary embodiment of the present disclosure.

FIG. 4 is a flow diagram of an exemplary method for enabling users to identify and submit information related to a request for information, printing, or services relating to a facility, according to an exemplary embodiment of the present disclosure. Specifically, FIG. 4 is a flowchart of a method 400 for fulfilling a request, according to an exemplary embodiment consistent with embodiments of the present disclosure. At step 402, a server, such as request server 205, may receive, from a user via a mobile device, such as mobile device 216, a communication regarding an entity, the communication may be entity information or an image. For example, the communication may be an image of the user's identification bar code 302a on the user's identification badge 302. In addition, or alternatively, the communication may be a selection of a piece of equipment from a list of equipment and/or an image of an identifier associated with a piece of equipment, other user, or office, for example, an image of the bar code 304a of a printer 304, or bar code 306a of a room 306, or any other identifier.

Based on entity information received and/or the image of the identifier received from the user's mobile device, the server, such as a request server 205, may access a database to retrieve information regarding the entity associated with the identifier (step 404). For example, request server 205 may communicate with the HR server systems 202 to access information regarding the user, based on the user's identification bar code 302a. As another example, request server 205 may communicate with the asset management server systems 206 to access information regarding a printer, such as printer 304.

At step 406, request server 205 may determine the location of the mobile device 216 from which the entity information and/or image was sent. This location determination may be based, in part, on receiving information regarding the location of the wireless connection point, such as WAP 134 (FIG. 1), which the mobile device 216 connected to in order to communicate with request server 205. For example, if the user of the mobile device 216 accessed the network 218 by connecting to a stationary wireless port, such as a wireless router connected to the network 220, the server may determine that the user is in close proximity to the stationary wireless port. In addition to, or alternatively request server 205 may determine the location of the user using global positioning ("GPS") data of the mobile device 216. The location of the user may be used by request server 205 to better facilitate the user's request. Additionally, or alternatively, the location may be determined by accessing HR server systems 202 for a default location of a user, such as a user's office or desk, determined by accessing asset management server systems 206 for a location of equipment, and/or determined by accessing facilities server system 208 for a room location.

At step 408, request server 205 may prompt the user to submit a specific request, based on the information retrieved from the other servers. For example, in a manner as described above, request server 205 may determine that the user is a new employee and has sent an image of an identifier associated with a printer. Based on this information, request server 205 may send a message to the user via the mobile device 216, in the form of a text, email or other form of communication prompting the user to submit a request, and may provide a list of options, such as if the user would like to connect to the printer, if the user would like to report a problem with the printer, if the user would like further information about the printer, etc. As another example, the request may be a request to access a calendar of the user, a request to create or edit an event for the calendar of the user, and/or a request to share a calendar or an event. The user may then submit a request in response to the prompt via the mobile device 216.

At step 410, request server 205 may receive the request and process it, such as sending the request to the relevant entity to fulfill the request and or retrieve any information in the request for the relevant database. Prior to processing the request, request server 205 may determine if the user is authorized to make the request. For example, request server 205 may retrieve information about the user from a server, such as HR server systems 202, based on the user's identifier. HR server systems 202 may include information regarding the type of requests that user is authorized to make. For example, HR server systems 202 may include various levels of security or permissions associated with each user and what type of requests the user may make using the network. Any suitable type or restrictions and categories may be associated with each user. These restrictions may be set by an administrator or any other suitable entity. For example, request server 205 may retrieve information about the user from HR server systems 202, such as that the user has left the company, and determine, based on this information, that the user is not authorized to make the request. In this case, request server 205 may send a communication to the mobile device 216 of the user, informing the user that they are not authorized to make the request. If request server 205 determines, based on information retrieved from the database(s), that the user is authorized to make the request, then the request may proceed to being processed at step 410.

Step 410 may include steps of sending and receiving communications, such as messages, documents, print commands, information, instructions, etc., to servers, printers, peripherals, mobile devices, other users, etc., in order to fulfill the request. For example, referring to the previous example, if the user requests, via the mobile device 216, to print to a printer 304 connected to the network 220, request server 205 may communicate with IT server systems 204 and the asset management server systems 206 to connect the mobile device 216 to the printer 304.

At step 412, depending on the request, request server 205 may check the status of the request by communication with the relevant server and then provide a status communication to the mobile device 216 regarding the request. Once the request has been completed, request server 205 may send a communication to the mobile device 216 at step 414, informing the user that the request has been completed. At step 416, request server 205 may update any databases based on the fulfilled request. For example, at step 416, the request server 205 may send finance server systems 224 information about a print job of a user. The cost of the print job of the user may then be calculated by finance server systems 224. Further, the cost may be associate with the user, a department of the user, and/or any other association, as desired.

In an example, in accordance with the present disclosure, the user may provide a request prior to sending an image of an identifier; therefore, the step or prompting the user for a request may be skipped. In another example, in accordance with the present disclosure, the user may provide a request at the same time as sending an image of the identifier and therefore the step of prompting the user for a request may be skipped.

Figure 5:
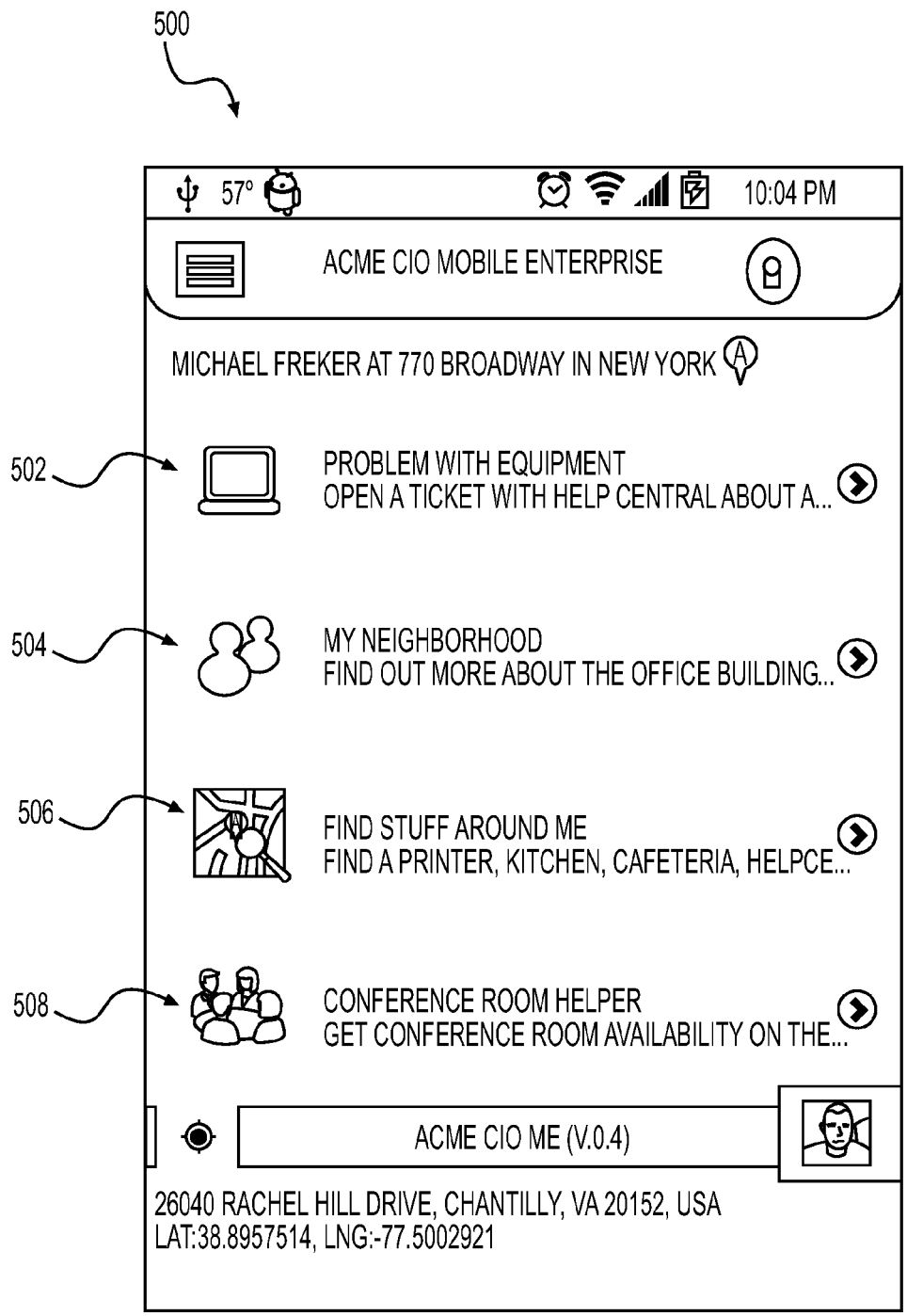
FIG. 5 is a screenshot of an exemplary mobile application for enabling users to identify and submit information related to a request for information or services relating to a facility, according to an exemplary embodiment of the present disclosure.

FIG. 5 is a screenshot of an exemplary mobile application for enabling users to identify and submit information related to a request for information or services relating to a facility, according to an exemplary embodiment of the present disclosure. Specifically, FIG. 5 depicts a mobile application interface 500 by which a user may submit information related to a request for information or services relating to a facility. For example, a user may be presented with one or more user elements 502, 504, 506, 508, which may be hyperlinks, buttons, or other mobile application elements that a user can select to initiate making a request for information or services. For example, as shown in FIG. 5, a user may manipulate user element 502 to issue a request for service relating to a "PROBLEM WITH EQUIPMENT." The user may manipulate user element 504 to issue a request for information relating to "MY NEIGHBORHOOD." The user may manipulate user element 506 to issue a request to "FIND STUFF AROUND ME." The user may manipulate user element 508 to issue a request for a "CONFERENCE ROOM HELPER." Of course, the indicated user elements are only exemplary of the many types of requests for information or services that may be implemented by a mobile application of a mobile device 216. When a user selects or otherwise manipulates one or more of user elements 502-508, the mobile device 216 may update its display with another presentation of information, forms, data, request options, etc. to further facilitate the user's request for information or services. In one embodiment, a combination of user elements 502-508 available/presented to a user may depend on a user's identity. Alternatively, a submenu or next screen displayed upon a user's selection of one of user elements 502-508 may depend on a user's identity.

Figure 6:
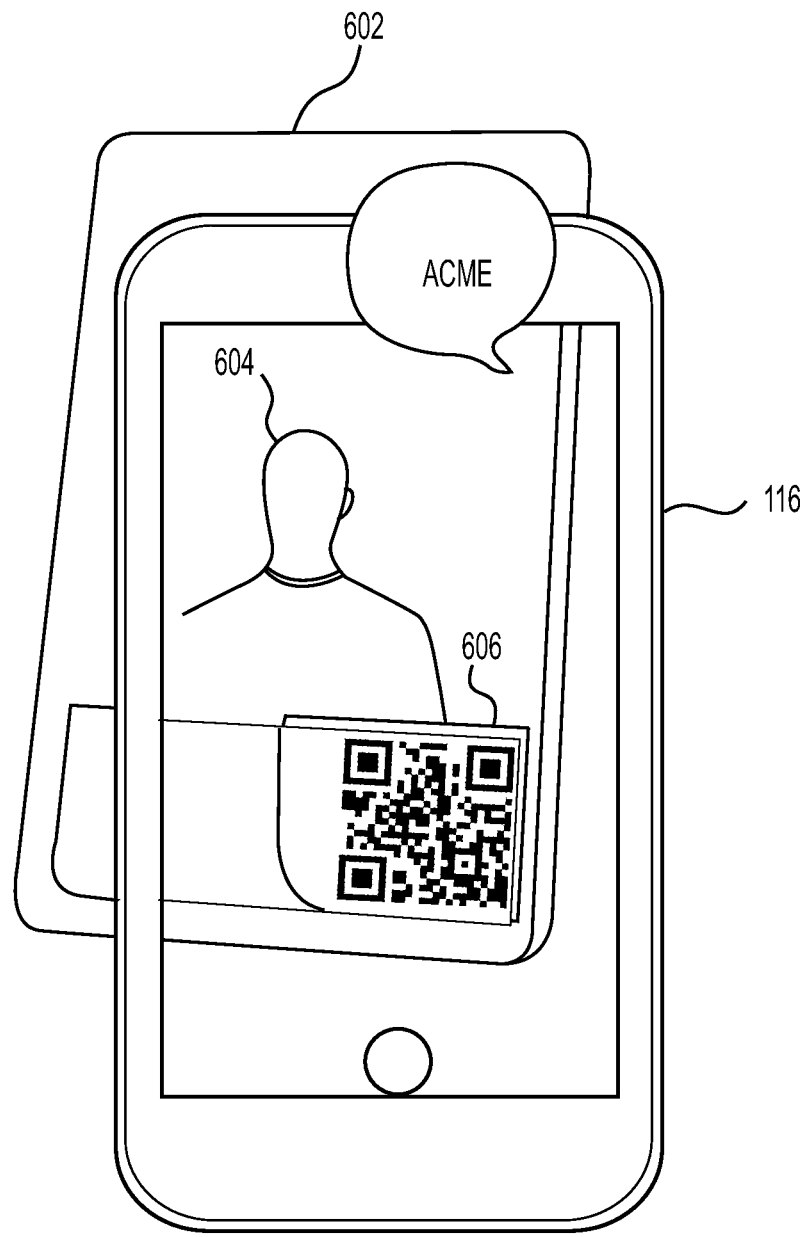
FIG. 6 is a schematic diagram of a device and indicia for enabling users to log-in to a mobile application for identifying and submitting information related to a request for information or services relating to a facility, according to an exemplary embodiment of the present disclosure.

Accordingly, FIG. 6 is a schematic diagram of a device and indicia for enabling users to log-in to a mobile application for identifying and submitting information related to a request for information or services relating to a facility, according to an exemplary embodiment of the present disclosure. Specifically, FIG. 6 depicts an embodiment in which a user may possess an ID card or badge 602 having, for example, a photograph, avatar, or other optional image 604, along with a machine-readable identifier or indicia 606. In one embodiment, as described above with respect to FIG. 3 (indicia 302a of badge 302), the indicia 606 may be a one or two dimensional barcode, such as, for example, a QR code. Thus, a user may operate his or her mobile device 216 (and a mobile application thereon) to capture an image of the indicia 606, or otherwise decode the indicia 606, to obtain at least a user identifier associated with the depicted user 604. Accordingly, a mobile application operating on mobile device 216 may identify a user (e.g., through the decoded unique ID), authenticate the user of the mobile application as being the owner of the mobile device 216, and tailor one or more presentations of data or generating of tickets based on the authenticated user identity.

Figure 7A:
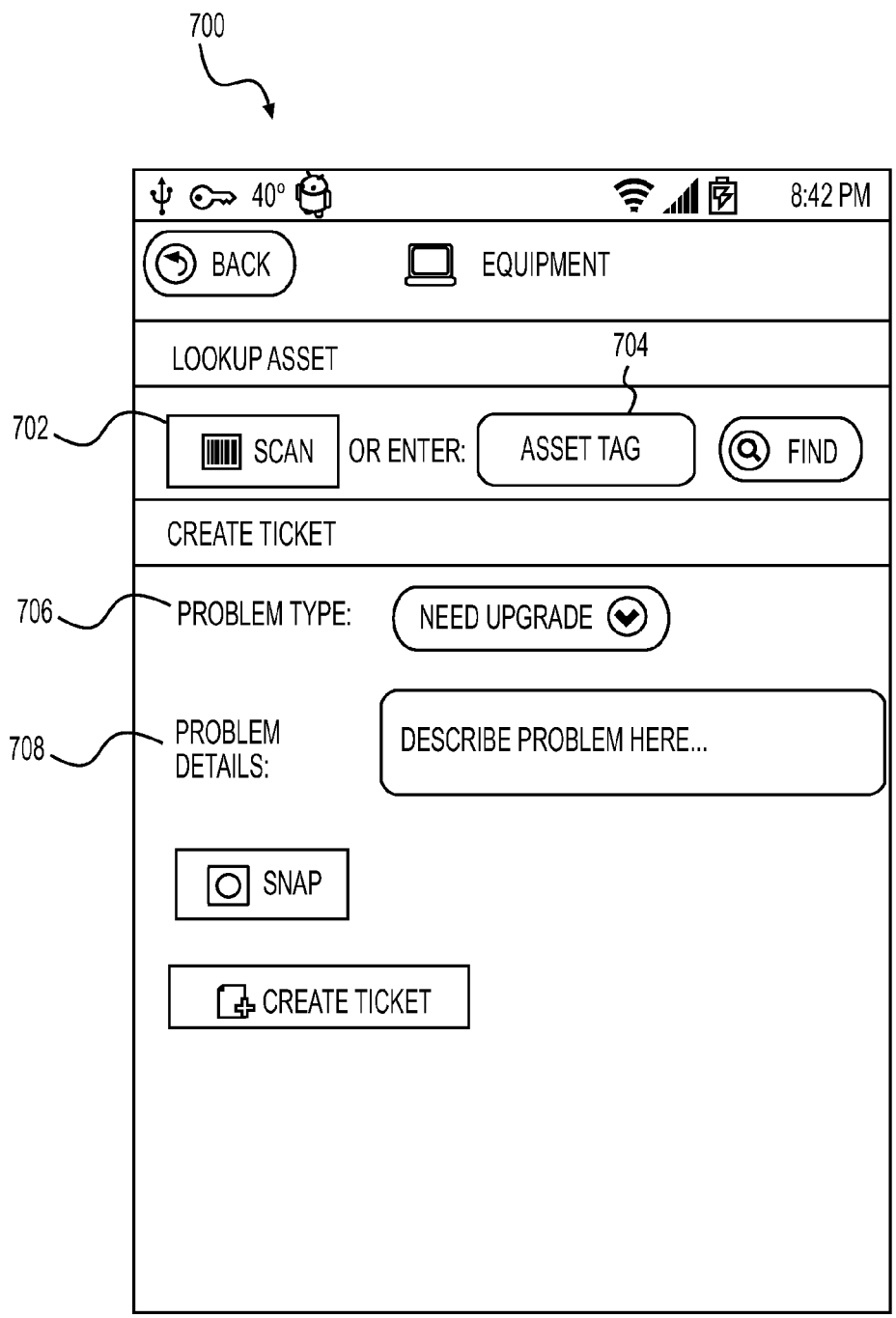
FIGS. 7A-7D are screenshots of an exemplary mobile application for enabling users to identify and submit information related to a request for services relating to a facility, according to an exemplary embodiment of the present disclosure.

FIGS. 7A-7D are screenshots of an exemplary mobile application for enabling users to identify and submit information related to a request for services relating to a facility, according to an exemplary embodiment of the present disclosure. Specifically, FIG. 7A is a screenshot of an exemplary mobile application interface 700 by which a user may submit a request for service relating to an asset or component of a facility. For example, a user may submit a request for service relating to a printer, fax machine, telephone, furniture, lab equipment, machine, tool, or any other asset within a facility. As shown in FIG. 7A, in one embodiment, a user may manipulate various user interface elements of interface 700 to generate and submit a request, for transmission through the mobile device 216.

For example, in one embodiment, the user may select element 702 to scan or otherwise image or decode machine-readable indicia printed on an asset. For example, the user may scan a barcode or QR code printed on a label of a piece of equipment, as shown with respect to the printer of FIG. 3. Alternatively, the user may select user element 704 to manually enter an asset tag or unique ID number using an alphanumeric keyboard of the user's device. In addition, as shown in FIG. 7A, a user may manipulate user element 706 to indicate a problem type, such as a malfunction of or damage to the selected equipment or asset. The user may also or alternatively type in a narrative description of a problem using user element or form 708.

Figure 7B:
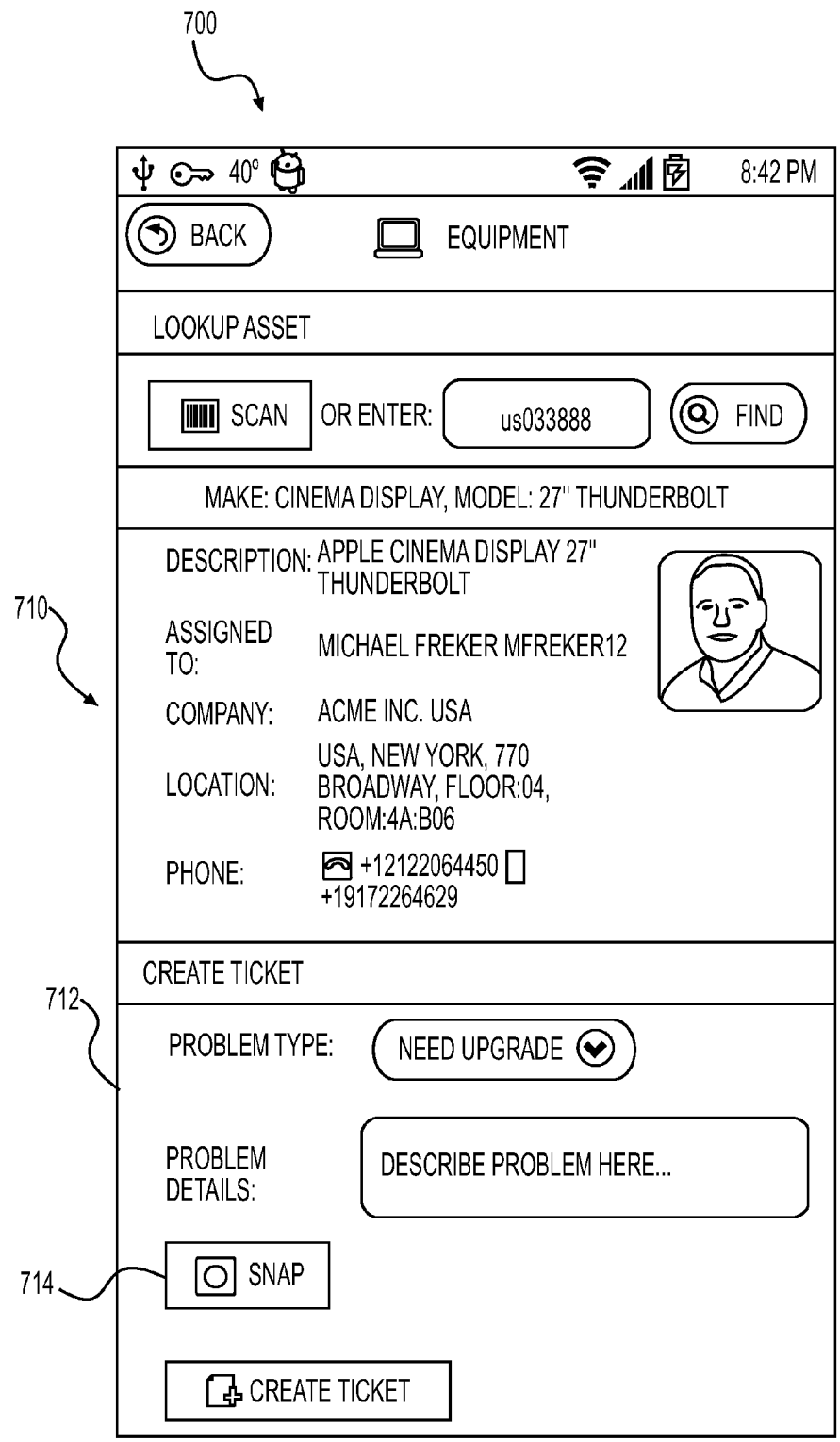

As shown in FIG. 7B, once a user has either successfully scanned an equipment or asset indicia, or manually entered an equipment or asset unique ID, the interface 700 may display profile information 710 associated with the equipment or asset. For example, profile information 710 may include a description of the asset or equipment; the name, number, ID, etc. of the individual to whom the asset or equipment is optionally assigned; a physical location of the asset or equipment (e.g., address, building number, room number, lat/long coordinates, etc.); and/or a phone number associated with a location or owner of the equipment or asset. As shown at ticket creation window 712, a user may enter a problem type, problem details, etc., and then manipulate user element 714 to snap a photograph of the equipment or asset to assist in locating, diagnosing, and/or repairing the subject asset or equipment. For example, as shown in FIG. 7C, the user may have uploaded a photograph 716 of a particular piece of equipment or asset for which the user is requesting information or service.

Figure 7C:
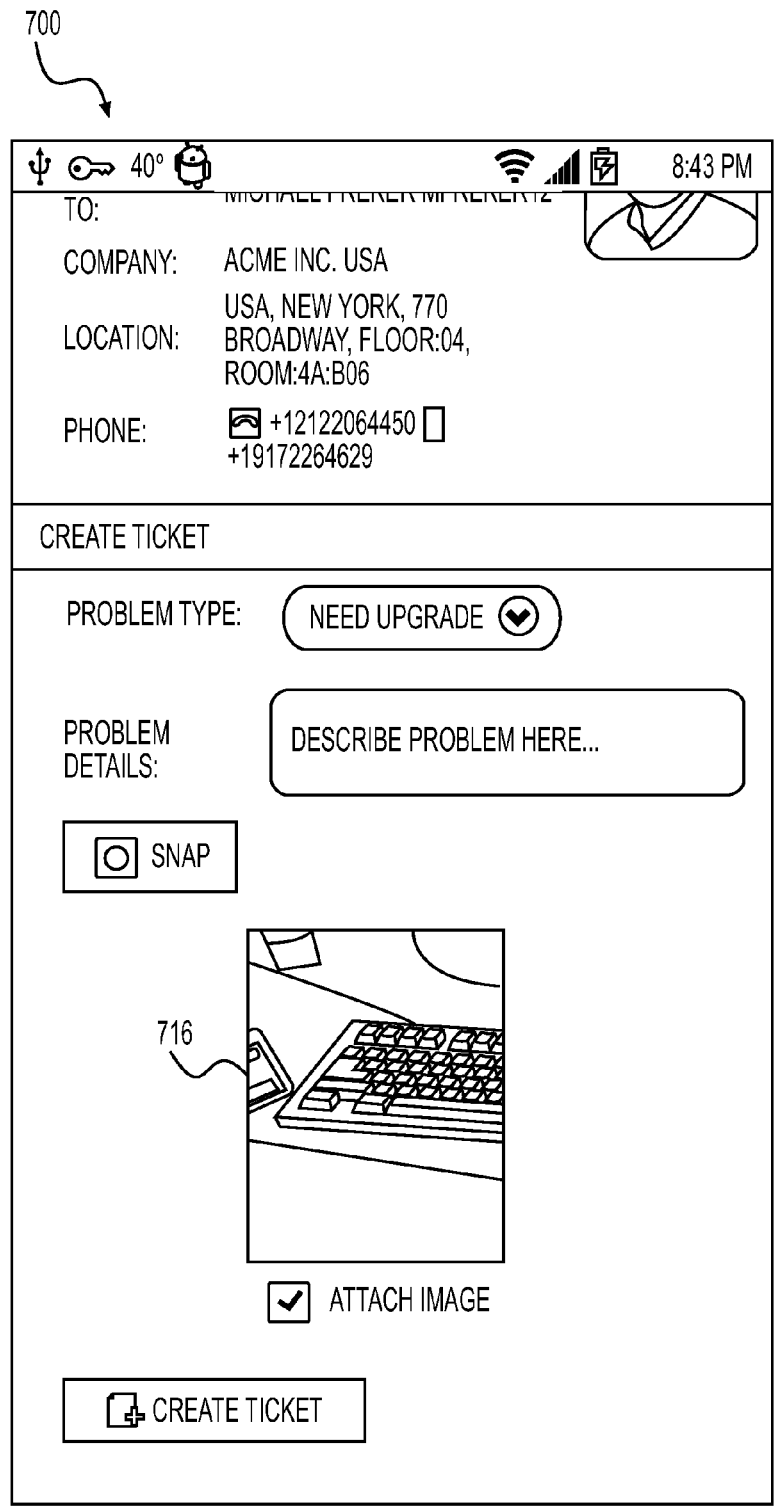
Figure 7D:
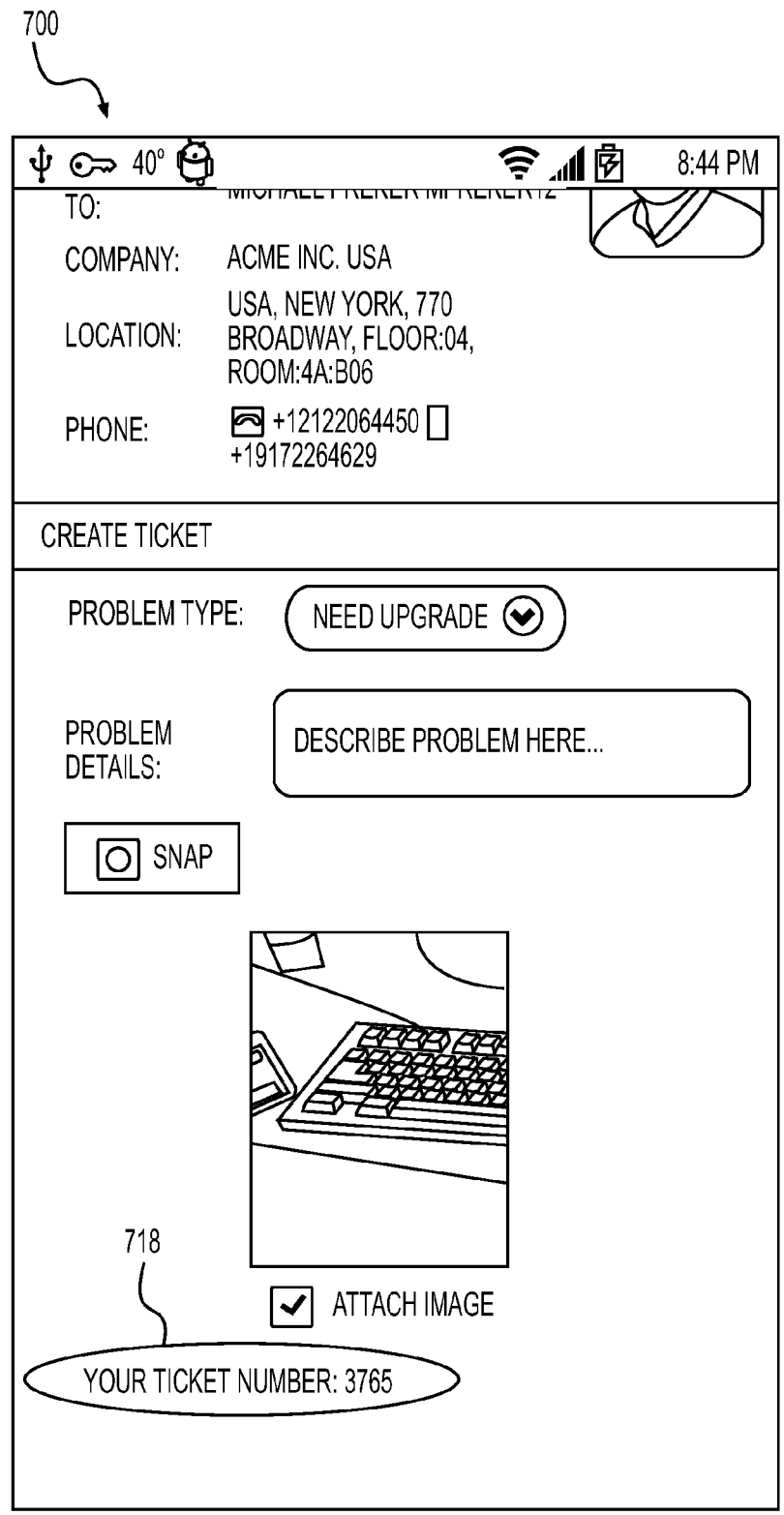

Accordingly, based on a user's interaction with the interfaces and user elements described and depicted with respect to FIGS. 7A-7C, system 200 of FIG. 2 may operate programmed instructions to execute a method of processing the user's request for service and/or generating a ticket to perform the user's requested service. For example, request server 205 may receive the request from a mobile device 216, store the received information in database(s) 210, execute processor(s) 212 to interact with one or more of HR server systems 202, IT server systems 204, asset management server systems 206, and facilities server systems 208 to obtain relevant information from those systems, and generate suitable requests relating to the equipment. In addition, UI module(s) 214 may update a display of information, repair tickets, etc. on a display of a mobile device 216. For example, as shown in FIG. 7D, processor(s) 212 may interact with one or more of HR server systems 202, IT server systems 204, asset management server systems 206, and facilities server systems 208 to generate a ticket, and interact with UI module(s) 214 to present a ticket and/or ticket number 718 to a user that requested the related service.

Figure 8A:
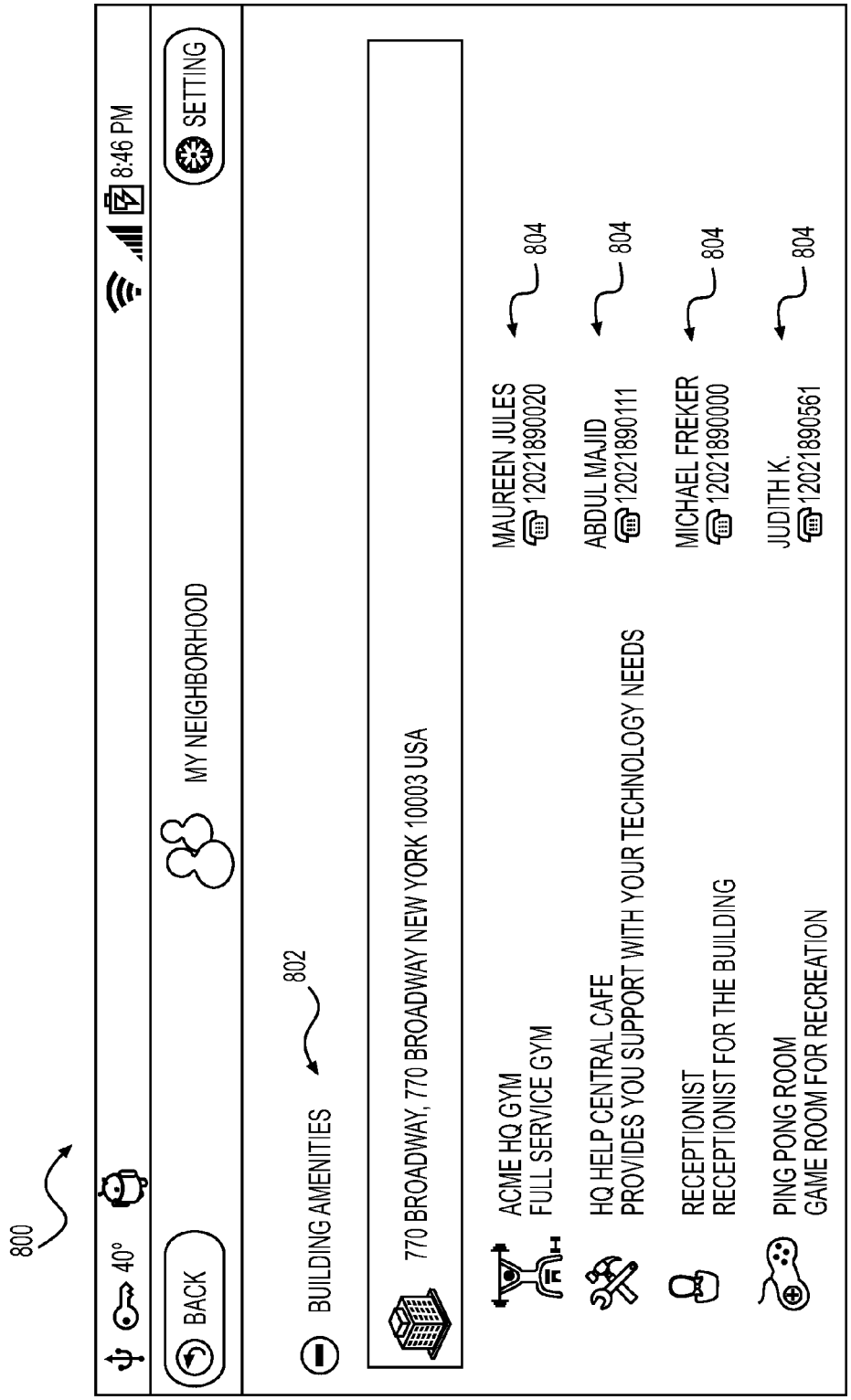
FIGS. 8A-8E are screenshots of an exemplary mobile application for enabling users to identify and submit information related to a request for information relating to a facility, according to an exemplary embodiment of the present disclosure.

FIGS. 8A-8E are screenshots of an exemplary mobile application for enabling users to identify and submit information related to a request for information relating to a facility, according to an exemplary embodiment of the present disclosure. Specifically, FIG. 8A depicts an exemplary mobile application interface 800 by which a user may submit a request for information relating to an asset or component of a facility. For example, a user may submit a request for information relating to available building amenities, equipment, directions, policies, etc. As shown in FIG. 8A, in one embodiment, a user may manipulate various user interface elements of interface 800 to generate and submit a request, for transmission through the mobile device 216. For example, a user may be presented with one or more user elements 804, which may be hyperlinks, buttons, or other mobile application elements that a user can select to initiate making a request for information. For example, as shown in FIG. 8A, a user may manipulate one or more of user elements 804 to issue requests for information relating to gyms, help centers, receptionists, game rooms, conference rooms, and so on. In one embodiment, the building amenities displayed in relation to user elements 804 may be sorted based on their respective location relative to a detected location of the user (i.e., with the closest building amenities listed first).

Figure 8B:
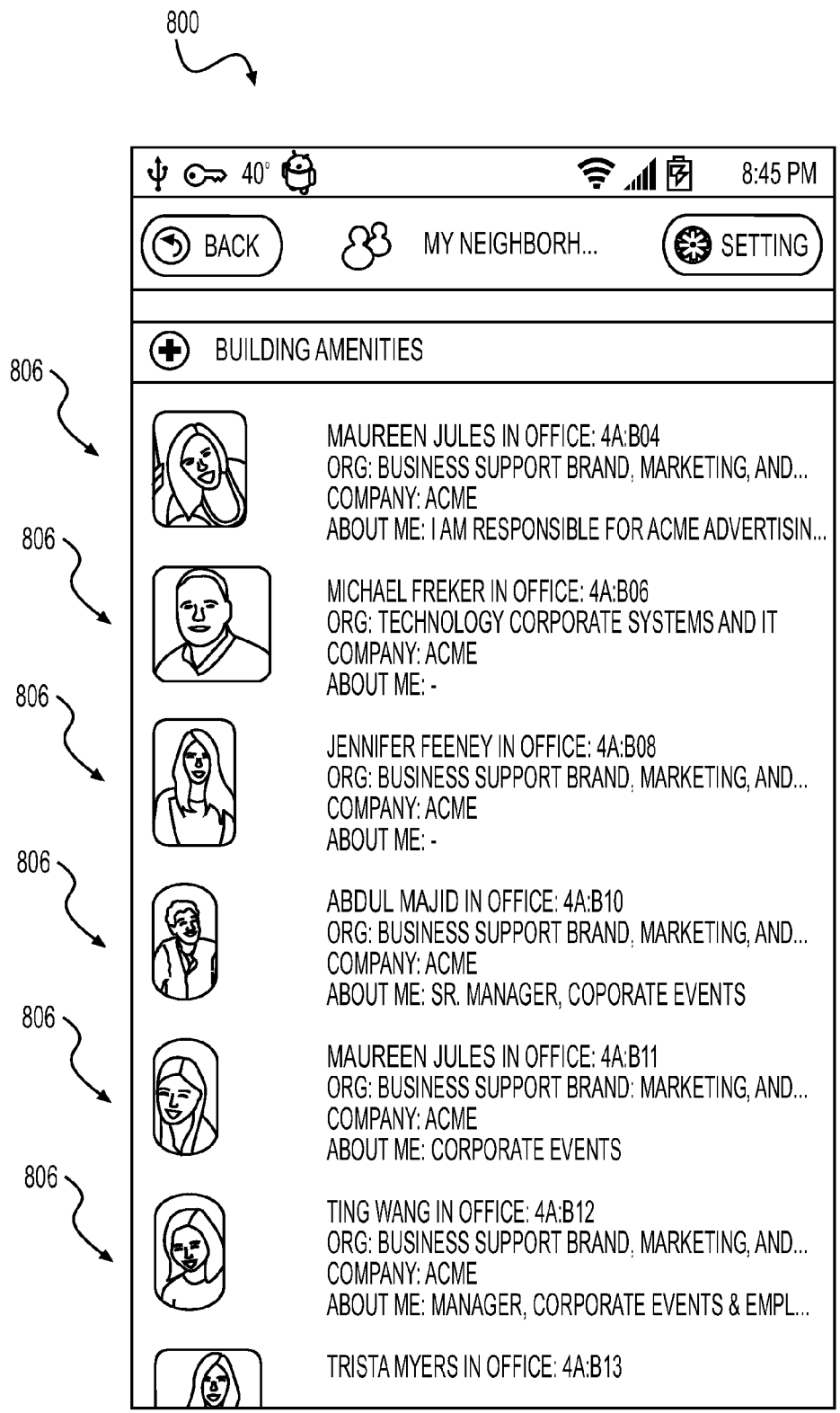

As shown in FIG. 8B, in one embodiment, the mobile application interface 800 may display indicia 806 representing individuals within some predetermined proximity of a detected location of the user. In one embodiment, the individuals displayed in relation to user elements 806 may be sorted based on their respective location relative to a detected location of the user (i.e., with the closest individuals listed first). In one embodiment, the displayed indicia 806 may include a name, office location, building location, phone number, or any other useful information stored in relation to the individual.

Figure 8C:
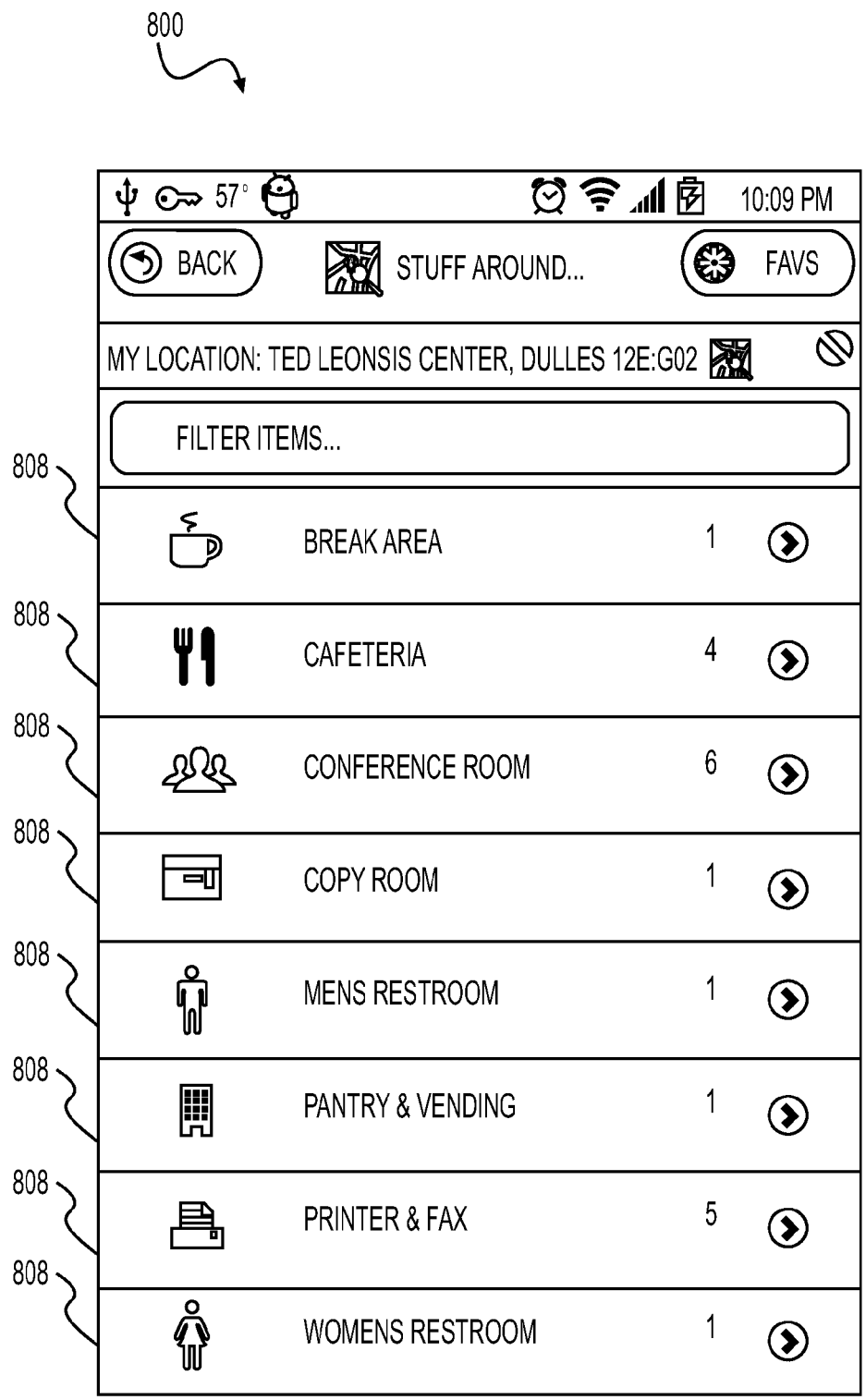

As shown in FIG. 8C, in one embodiment, the mobile application interface 800 may display indicia 808 representing amenities within some predetermined proximity of a detected location of the user. For example, the amenities may include break areas, cafeterias, conference rooms, copy rooms, restrooms, vending areas, printers, etc. In one embodiment, the amenities displayed in relation to user elements 808 may be sorted based on their respective location relative to a detected location of the user (i.e., with the closest building amenities listed first). In one embodiment, the displayed indicia 808 may include a name, office location, building location, phone number, or any other useful information stored in relation to the amenity.

Figure 8D:
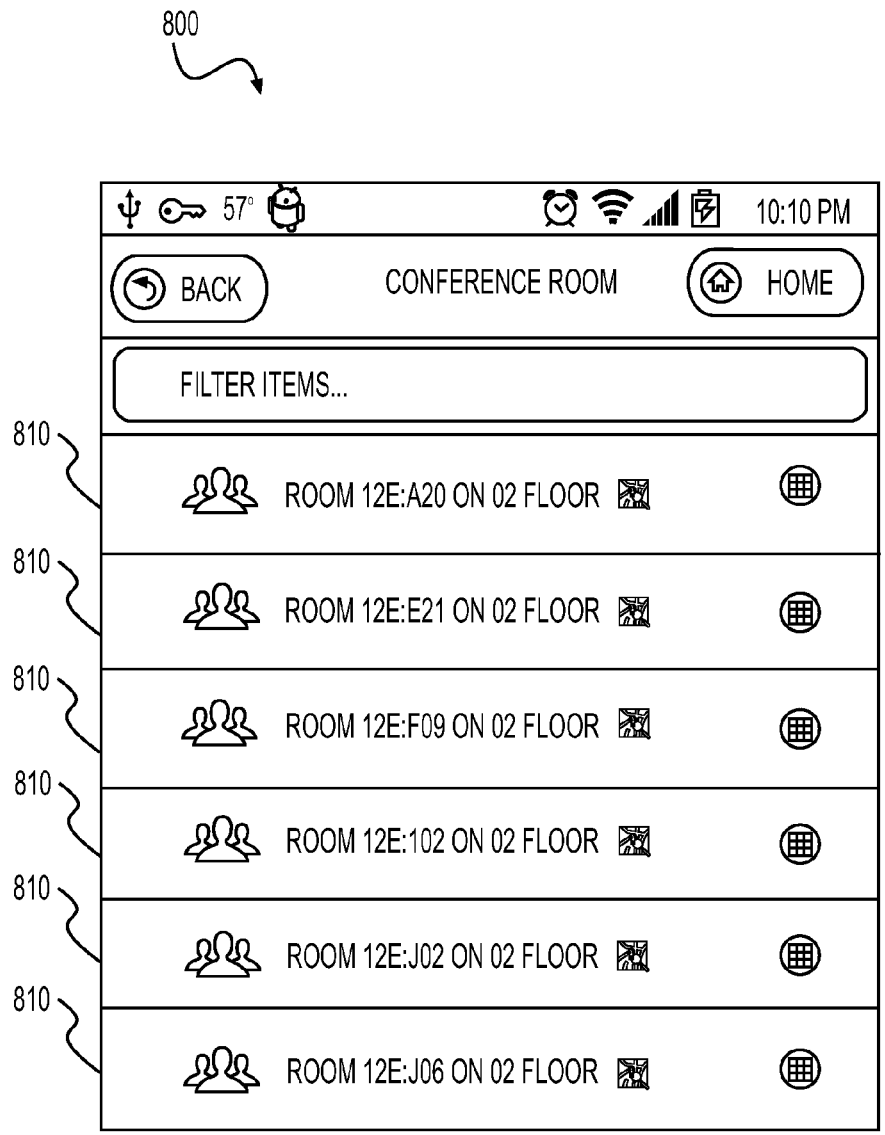

As shown in FIG. 8D, in one embodiment, the mobile application interface 800 may display indicia 810 representing facilities, rooms, or offices within some predetermined proximity of a detected location of the user. For example, the facilities may include any type of office or conference room. In one embodiment, the facilities displayed in relation to user elements 810 may be sorted based on their respective location relative to a detected location of the user (i.e., with the closest building facilities listed first). In one embodiment, the displayed indicia 810 may include a name, office location, building location, phone number, or any other useful information stored in relation to the facilities.

Figure 8E:
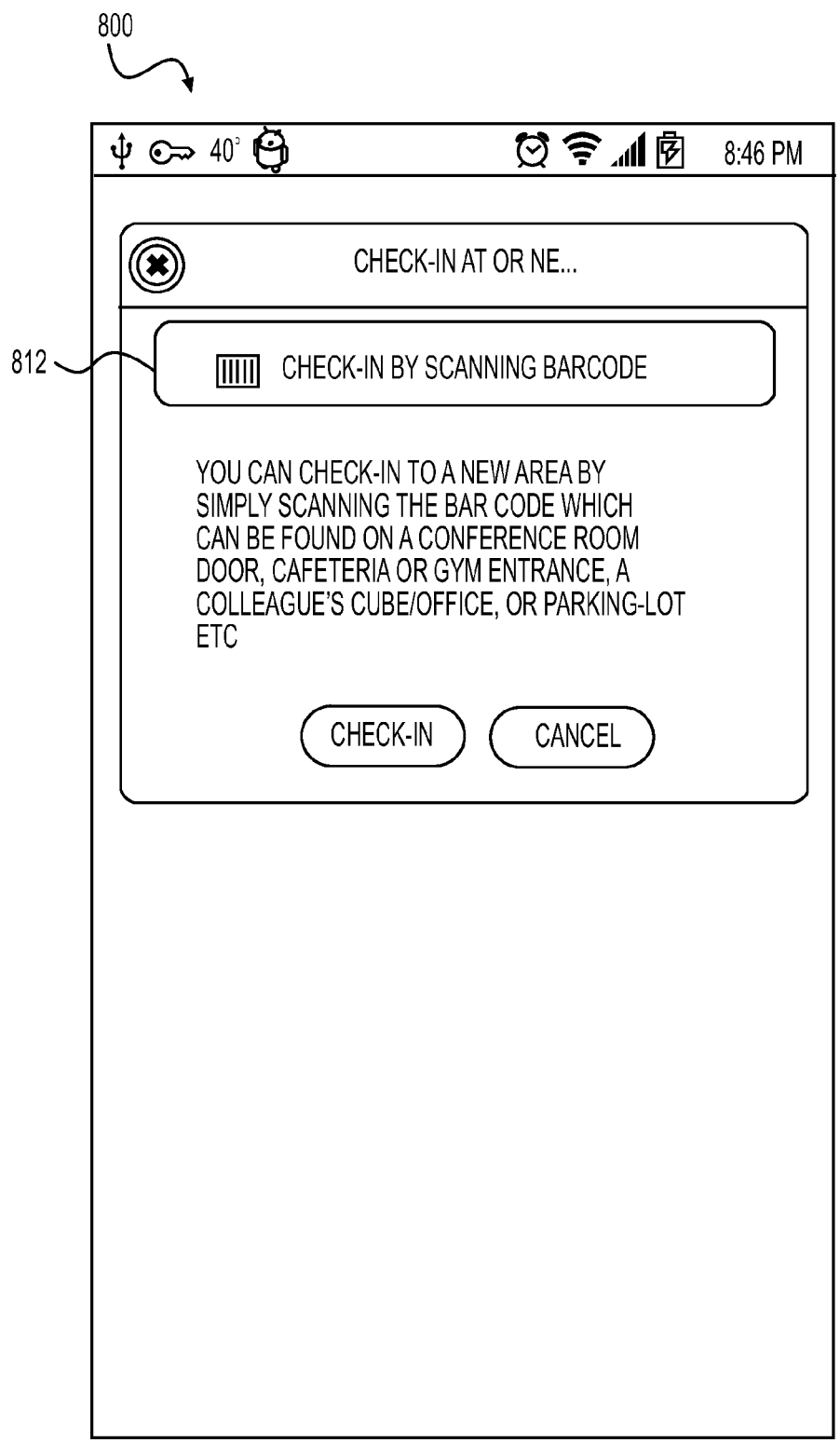

In one embodiment, as shown in FIG. 8E, a user may be able to manipulate the mobile application operating on the mobile device 216 to "check-in" to any desired location. For example, the user may publically or semi-publically associate himself or herself with some particular location by scanning a barcode (e.g., by manipulating user element 812 of interface 800) known to have a particular location. For example, the user may check-in to a particular office or conference room by scanning a barcode or QR code on the door or wall of that room. Alternatively, the user may check-in to the office or room by scanning a barcode or QR code on a piece of equipment in that room.

Figure 9A:
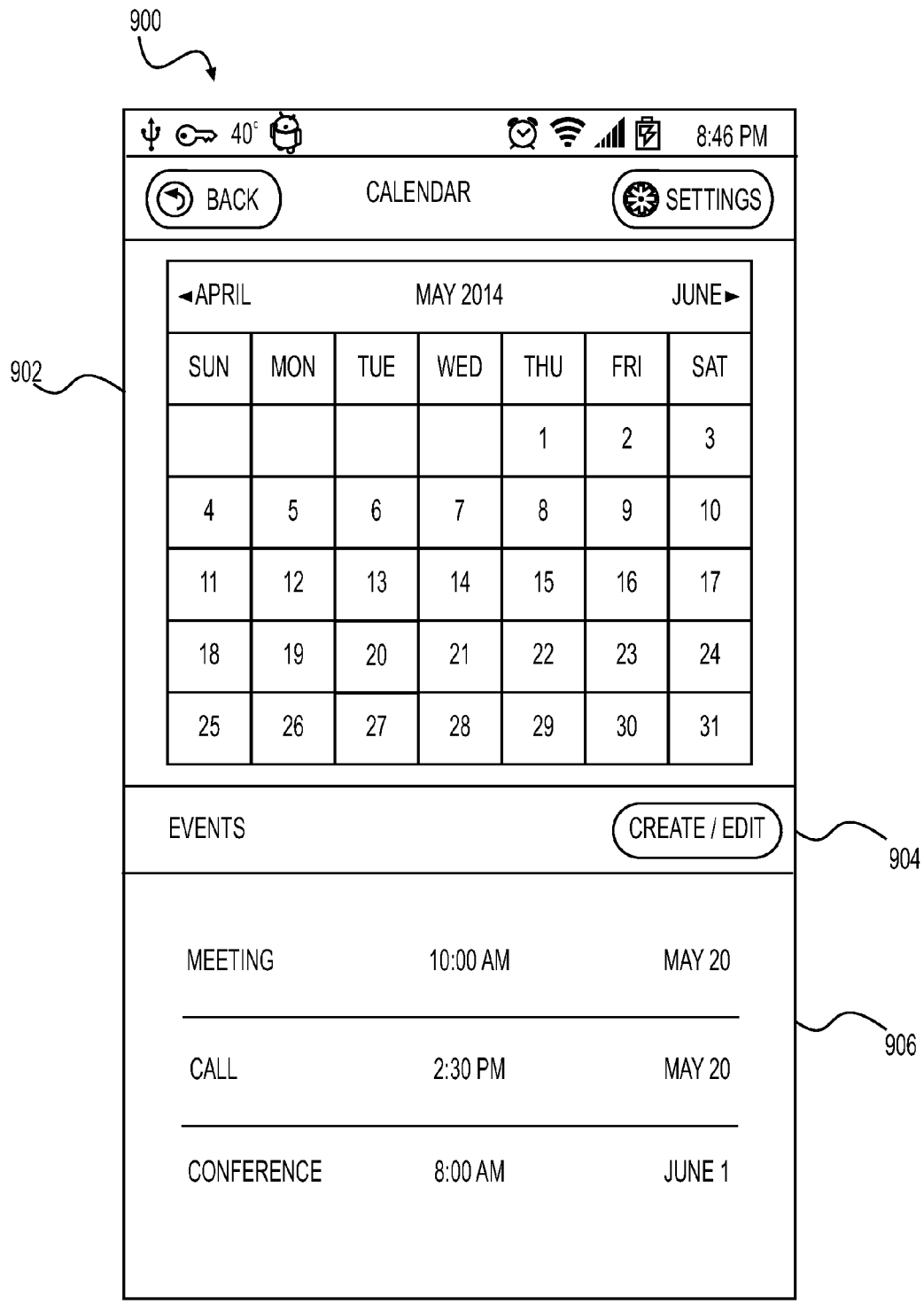
FIGS. 9A-9B are screenshots of an exemplary mobile application for dynamic mobile printing based on scheduled events, according to an exemplary embodiment of the present disclosure.
Figure 9B:
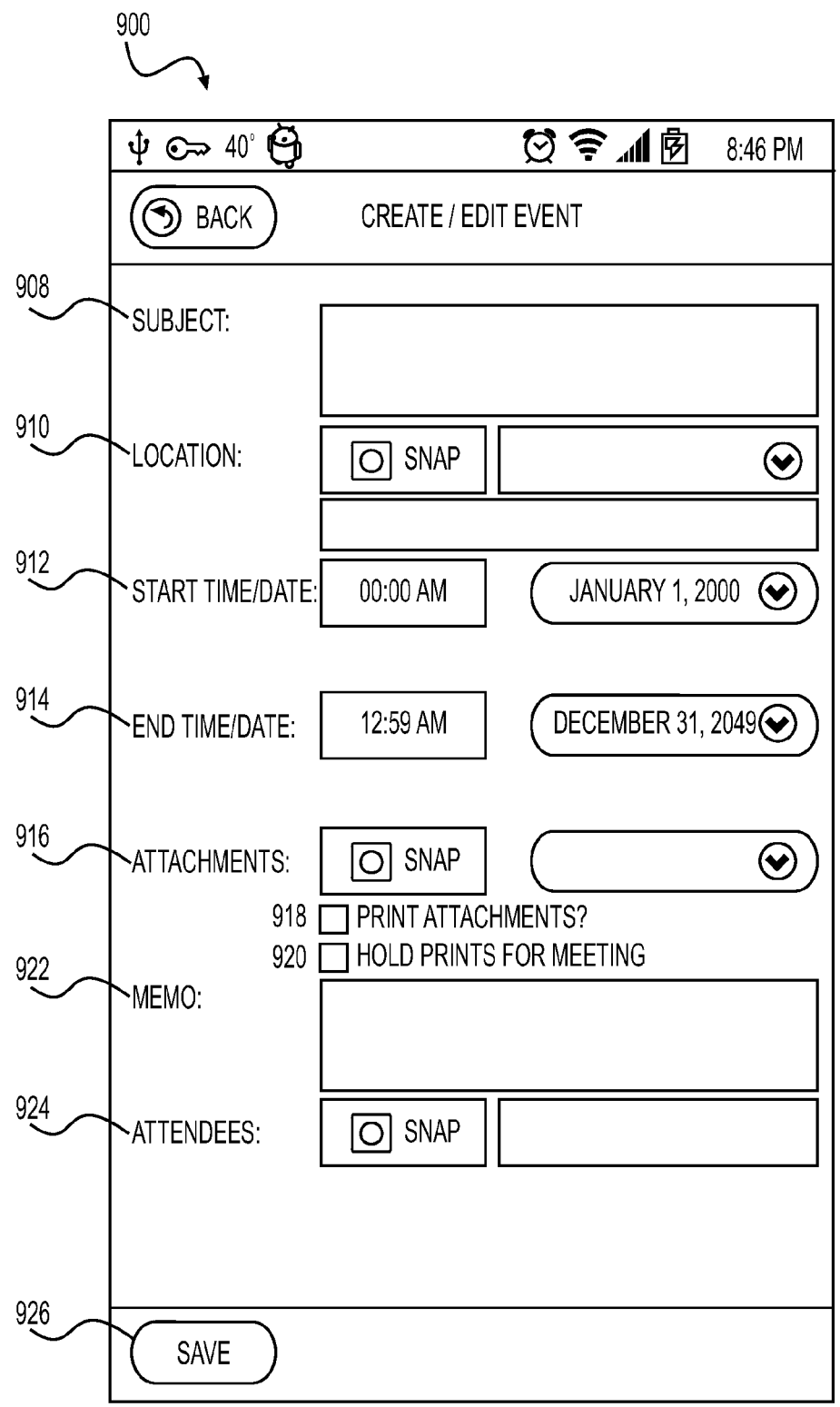

FIGS. 9A-9B are screenshots of an exemplary mobile application for enabling users to view their respective calendars by accessing calendar server systems 222, and create and/or edit events for a user's calendar, according to an exemplary embodiment of the present disclosure. Specifically, FIG. 9A is a screenshot of an exemplary mobile application for a calendar and enabling users to view and/or schedule events, meetings, and/or reminders, according to an exemplary embodiment of the present disclosure. Specifically, FIG. 9A depicts a mobile application interface 900 by which a user may view a calendar and events and create and/or edit events for the calendar. For example, a user may be presented with one or more user elements 902, 904, 906, which may be hyperlinks, buttons, or other mobile application elements that a user can select to review a calendar and event and/or create events for the calendar of the user. For example, as shown in FIG. 9A, a user may manipulate user element 902 to select a day, month, and/or year to review events for the selected date. The user may manipulate user element 904 to create or edit events for the selected date. The user may manipulate user element 906 to review one or more events for a selected date and/or one or more events near the selected date. Of course, the indicated user elements are only exemplary of the many types of ways to review, create, and/or edit events that may be implemented by a mobile application of a mobile device 216. When a user selects or otherwise manipulates one or more of user elements 902-906, the mobile device 216 may update its display with another presentation of information, forms, data, request options, etc. to further facilitate the user's request for information or services by accessing the calendar server system 222. In one embodiment, a combination of user elements 902-906 available/presented to a user may depend on a user's identity. Alternatively, a sub-menu or next screen displayed upon a user's selection of one of user elements 902-906 may depend on a user's identity.

As shown in FIG. 9B, after selecting to create or edit an event, for example, by interacting with user element 904, the interface 900 may display event information, as shown by elements 908-922, that are associated with an event of a calendar of the user. The event information may be pre-populated with event information by accessing calendar server system 222, when creating a new event and/or editing an existing event. As shown by user element 908, a subject of the meeting, event, reminder, and/or appointment may be entered manually, if desired.

In one embodiment, the user may select user element 910 to scan or otherwise image or decode machine-readable indicia printed on an asset, such as a conference room and/or office. For example, the user may scan a barcode or QR code printed, such as indicia 116 of a room 110, as shown with respect to the printer of FIGS. 1 and 3. Alternatively, the user may select user element 910 to manually enter or select an asset tag or unique ID number using an alphanumeric keyboard of a mobile device.

User elements 912 and 914 enable a user to manually enter or select a start time and date for an event and an end time and date for the event. The user may select user element 916 to scan or otherwise image or decode machine-readable indicia printed on an asset, such as a printer, to use. Further, user element 916 may enable a user to manually enter or select attachments, such as documents, images, files, etc., associated with the meeting. User element 918, when selected, may enable the printing of the attachments. User element 920, when selected, may enable the printing of the attachments to be queued in a printing queue for printing at or near the meeting time and date.

As shown by user element 922, a user may enter a memo and/or notes associated with the event. User element 924 may enable a user to add attendees for the event. The user may select user element 924 to scan or otherwise image or decode machine-readable indicia printed on an asset, such as an ID badge. For example, the user may scan a barcode or QR code, such as an ID badge 302 of a user, as shown with respect to the ID badge of FIG. 3. Alternatively, the user may select user element 924 to manually enter attendees or select attendees based on their name, unique ID number, etc., using an alphanumeric keyboard of a mobile device. User element 926 may save the event to the calendar of the user, which may be stored in the calendar server system 222.

Figure 10:
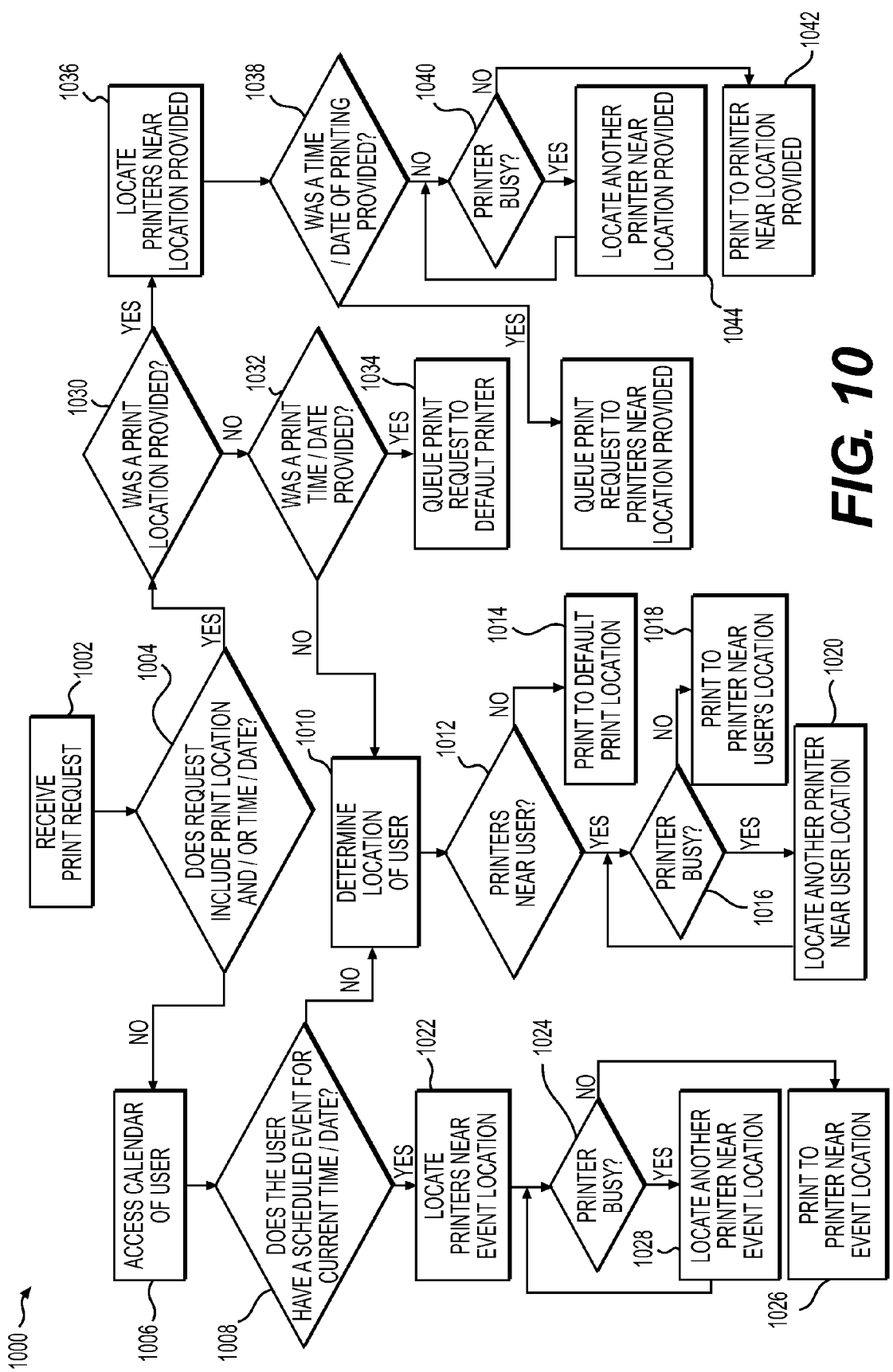
FIG. 10 is a flow diagram of an exemplary method for dynamic mobile printing based on scheduled events according to an exemplary embodiment of the present disclosure.

FIG. 10 is a flow diagram of an exemplary method for enabling printing based on events scheduled in a calendar of a user, according to an exemplary embodiment of the present disclosure. Specifically, FIG. 10 is a flowchart of a method 1000 for fulfilling a print request, according to an exemplary embodiment consistent with embodiments of the present disclosure. At step 1002, a server, such as request server 205, may receive, from a user via a mobile device, such as mobile device 216, a communication including an identifier associated with the user and a print request. The print request may include one or more print items to be printed, such as the attachments of user element 916, as discussed above in reference to FIG. 9B. In addition, the print request may include printer information, which may identify a printer and/or a printer location in which the one or more print items are to be printed. The printer information may be a selection of a printer from a list of printers, a selection of a location from a list of locations and/or an image of an identifier associated with a printer and/or an identifier associated with a location, for example, an image of the bar code 304a of a printer 304, or bar code 306a of a room 306, or any other identifier. The print request may also include time/date information, which may identify a day and time in which the one or more print items are to be printed. The time/date information may be retrieved from user element 912, as discussed above in reference to FIG. 9B.

Based on the print request, the server may determine whether the print request includes printer information and/or time/date information (step 1004). If the print request does not include printer information and/or time/date information, the method 1000 proceeds to step 1006. If the print request includes at least one of printer information and time/date information, the method 1000 proceeds to step 1030.

At step 1006, the server may access a database to retrieve a calendar of the user based on the identifier received with the communication. For example, request server 205 may communicate with the calendar server systems 222 to access a calendar of the user associated with the identifier. Based on the accessed calendar of the user, the server may determine whether an event is scheduled for a time of interest. The time of interest may be a current time and date, a period before a current time and date and including the current time and date, a period before a current time and date, a current time and date and a period after, a period after a current time and date, a period around a current time and date, and/or a period around a current time and date and including the current time and date. If there is no scheduled event for time of interest, the method 1000 proceeds to step 1010. If there is a scheduled event for the time of interest, the method 1000 proceeds to step 1022.

At step 1010, the server may determine a location of the user. The server may locate a mobile device of the user from which the communication including the print request was sent. This location determination may be based, in part, on receiving information regarding the location of the wireless connection point, such as WAP 134 (FIG. 1), which the mobile device connected to in order to communicate with the server. For example, if the user of the mobile device accessed the network 218 by connecting to a stationary wireless port, such as a wireless router connected to the network 220, the server may determine that the user is in close proximity to the stationary wireless port. In addition, or alternatively, the server may determine the location of the user using GPS data of the mobile device. Additionally, or alternatively, the location may be determined by accessing HR server systems 202 for a default location of the user, such as a user's office or desk, determined by accessing asset management server systems 206 for a location of equipment, and/or determined by accessing facilities server system 208 for a room location.

After the location of the user has been determined, the server may determine whether there are any printers near the location of the user (step 1012). For example, with the location information determined at step 1010, the server may access asset management server systems 206 and/or facilities server systems 208 for locations of one or more printers near the location of the user. If there are no printers near the location of the user or if the location of the user cannot be determined, the method 1000 proceeds to step 1014, in which the one or more print items are printed to a default printer of the user or at a default location of the user. If there are printers near the location of the user, the method 1000 proceeds to step 1016.

At step 1016, the server may select a printer near the location of the user and may determine whether the printer is busy. If the printer is not busy, the method 1000 proceeds to step 1018, in which the one or more print items may be printed on the printer near the location of the user. If the printer is busy, the method 1000 proceeds to step 1020, in which another printer near the location of the user, if any, is selected and then proceeds to step 1016.

If there is a scheduled event for the time of interest (step 1008), the server locates one or more printers near the location of the scheduled event (step 1022). For example, the server may use the location information for the event, such as the location information provided in user element 910 of FIG. 9B, and asset management server systems 206 and/or facilities server systems 208, to locate one or more printers near the location of the scheduled event. If there are no printers near the location of the event and/or if the location of the event cannot be determined, the one or more print items may be printed to a default printer of the user or at a default location of the user.

At step 1024, the server may select a printer near the scheduled event location and may determine whether the printer is busy. If the printer is not busy, the method 1000 proceeds to step 1026, in which the one or more print items are printed on the printer near the scheduled event location. If the printer is busy, the method 1000 proceeds to step 1028, in which another printer near the scheduled event location, if any, is selected and then proceeds to step 1024.

If the print request includes at least one of printer information and time/date information (step 1004), the server may determine whether a printer location was provided with the printer information (1030). For example, the server may use the location information for the event when user element 918 is selected. The location information provided in user element 910 of FIG. 9B, and asset management server systems 206 and/or facilities server systems 208, to locate one or more printers. If the printer location was not provided, the method 1000 may proceed to step 1032. If the printer location was provided, the method 1000 may proceed to step 1036.

At step 1032, the server may determine whether time/date information was provided. If time/date information was provided, the server may queue the one or more one or more print items to be printed at the time and the date of the time/date information to a default printer of a user (step 1034). If time/date information was not provided, the method 1000 proceeds to step 1010.

If the printer location was provided (step 1030), the server may locate one or more printers near the printer location provided (step 1036). For example, the server may locate or more printers by accessing asset management server systems 206 for a location of equipment, and/or accessing facilities server system 208 for a room location of one or more printers.

After one or more printers are located near the printer location provided, the server may determine whether time/date information was provided (step 1038). If time/date information was provided, the server may queue the one or more one or more print items to be printed at the time and the date of the time/date information to the one or more printers located near the printer location provided (step 1046). If time/date information was not provided, the method 1000 proceeds to step 1040.

At step 1040, the server may select a printer near the location provided and may determine whether the printer is busy. If the printer is not busy, the method 1000 proceeds to step 1042, in which the one or more print items are printed on the printer near the printer location provided. If the printer is busy, the method 1000 proceeds to step 1044, in which another printer near the printer location provided, if any, is selected and then proceeds to step 1040.

Figure 11:
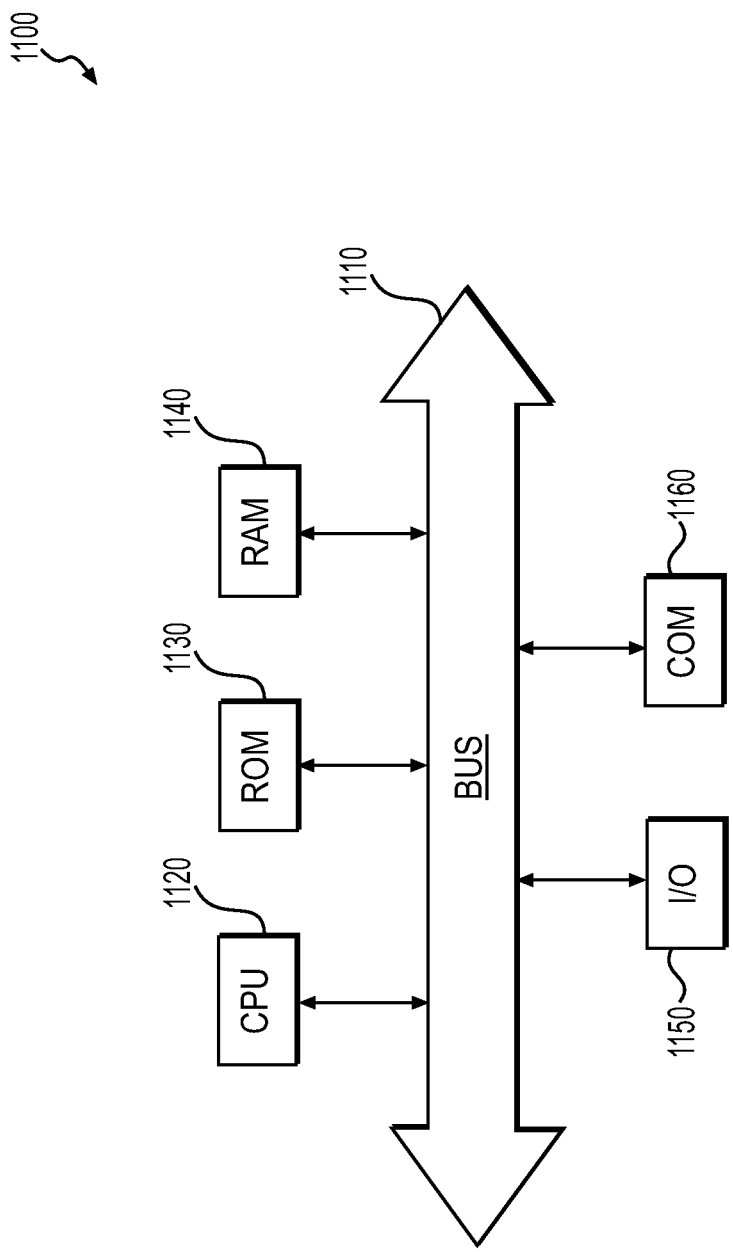
FIG. 11 is a simplified functional block diagram of a computer that may be configured as a device or server for executing the methods of FIGS. 4 and 10, according to exemplary embodiments of the present disclosure.

FIG. 11 is a simplified functional block diagram of a computer that may be configured as a client, agent, or server for executing the methods of FIGS. 4 and 10, according to exemplary an embodiment of the present disclosure. Specifically, in one embodiment, as shown in FIG. 11, any of HR server systems 202, IT server systems 204, request server 205, asset management server systems 206, facilities server systems 208, mobile devices 216, calendar server systems 222, and/or finance server systems 224 may be an assembly of hardware 1100 including, for example, a data communication interface 1160 for packet data communication. The platform may also include a central processing unit ("CPU") 1120, in the form of one or more processors, for executing program instructions. The platform typically includes an internal communication bus 1110, program storage, and data storage for various data files to be processed and/or communicated by the platform such as ROM 1130 and RAM 1140, although the system 1100 often receives programming and data via network communications 1170. The system 1100 also may include input and output ports 1150 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for dynamic mobile printing based on scheduled events, the method comprising:
   receiving, from a device associated with a user, an identifier associated with the user and a print request, the print request including one or more print items to be printed;
   accessing, by a server, a calendar of the user based on the received identifier associated with the user;
   determining, by the server, whether an event of the calendar is scheduled for a time of interest;
   locating, by the server, a printer near a location of the event when the event is scheduled for the time of interest; and
   transmitting, by the server, the one or more print items to the printer near the location of the event.

2. The method of claim 1, further comprising:
   determining, by the server, whether the printer near the location of the event is busy;
   locating, by the server, a second printer near the location of the event when the printer near the location of the event is busy; and
   transmitting, by the server, the one or more print items to the second printer near the location of the event.

3. The method of claim 1, further comprising:
   determining, by the server, a location of the user when an event is not scheduled for the time of interest;
   locating, by the server, a printer near a location of the user when the location of the user is determined; and
   transmitting, by the server, the one or more print items to the printer near the location of the user.

4. The method of claim 3, further comprising:
   determining, by the server, whether the printer near the location of the user is busy;
   locating, by the server, a second printer near the location of the user when the printer near the location of the event is busy; and
   transmitting, by the server, the one or more print items to the second printer near the location of the user.

5. The method of claim 1, further comprising:
   determining, by the server, a location of the user when an event is not scheduled for the time of interest; and
   transmitting, by the server, the one or more print items to a default printer when the location of the user is not determined.

6. The method of claim 1, wherein the print request further includes a print time in which the one or more print items is to be printed, and
   wherein queuing the one or more print items to print to a default printer at the print time when the print request includes a print time.

7. The method of claim 1, wherein the identifier associated with the user is captured by the device associated with the user.

8. The method of claim 1, wherein the time of interest is at least one of a current time and date, a period before a current time and date and including the current time and date, a period before a current time and date, a current time and date and a period after, a period after a current time and date, a period around a current time and date, and/or a period around a current time and date and including the current time and date.

9. The method of claim 1, wherein location of the event of the calendar is captured by the device associated with the user.

10. A system for dynamic mobile printing based on scheduled events, the system comprising:
    a memory storage device storing instructions for dynamic mobile printing based on scheduled events; and
    one or more processors configured to execute the instructions to perform a method including:
       receiving, from a device associated with a user, an identifier associated with the user and a print request, the print request including one or more print items to be printed;
       accessing, by a server, a calendar of the user based on the received identifier associated with the user;
       determining, by the server, whether an event of the calendar is scheduled for a time of interest;
       locating, by the server, a printer near a location of the event when the event is scheduled for the time of interest; and
       transmitting, by the server, the one or more print items to the printer near the location of the event.

11. The system of claim 10, wherein the processor is further configured for:
    determining, by the server, whether the printer near the location of the event is busy;
    locating, by the server, a second printer near the location of the event when the printer near the location of the event is busy; and
    transmitting, by the server, the one or more print items to the second printer near the location of the event.

12. The system of claim 10, wherein the processor is further configured for:
- determining, by the server, a location of the user when an event is not scheduled for the time of interest;
- locating, by the server, a printer near a location of the user when the location of the user is determined; and
- transmitting, by the server, the one or more print items to the printer near the location of the user.

13. The system of claim 12, wherein the processor is further configured for:
- determining, by the server, whether the printer near the location of the user is busy;
- locating, by the server, a second printer near the location of the user when the printer near the location of the event is busy; and
- transmitting, by the server, the one or more print items to the second printer near the location of the user.

14. The system of claim 10, wherein the processor is further configured for:
- determining, by the server, a location of the user when an event is not scheduled for the time of interest; and
- transmitting, by the server, the one or more print items to a default printer when the location of the user is not determined.

15. The system of claim 10, wherein the print request further includes a print time in which the one or more print items is to be printed, and
- wherein queuing the one or more print items to print to a default printer at the print time when the print request includes a print time.

16. The system of claim 10, wherein the an identifier associated with the user is captured by the device associated with the user.

17. The system of claim 10, wherein the time of interest is at least one of a current time and date, a period before a current time and date and including the current time and date, a period before a current time and date, a current time and date and a period after, a period after a current time and date, a period around a current time and date, and/or a period around a current time and date and including the current time and date.

18. The system of claim 10, wherein a location of the event of the calendar is are captured by the device associated with the user.

19. A non-transitory computer-readable medium storing instructions that, when executed by a processor, cause the processor to execute a method for dynamic mobile printing based on scheduled events, the method comprising:
- receiving, from a device associated with a user, an identifier associated with the user and a print request, the print request including one or more print items to be printed;
- accessing, by a server, a calendar of the user based on the received identifier associated with the user;
- determining, by the server, whether an event of the calendar is scheduled for a time of interest;
- locating, by the server, a printer near a location of the event when the event is scheduled for the time of interest; and
- transmitting, by the server, the one or more print items to the printer near the location of the event.

20. The computer-readable medium of claim 19, wherein the further comprises:
- determining, by the server, whether the printer near the location of the event is busy;
- locating, by the server, a second printer near the location of the event when the printer near the location of the event is busy; and
- transmitting, by the server, the one or more print items to the second printer near the location of the event.

* * * * *